US009690914B2

(12) United States Patent
Stewart et al.

(10) Patent No.: US 9,690,914 B2
(45) Date of Patent: Jun. 27, 2017

(54) METHOD OF PROTECTING COMPUTER PROGRAM CODE

(75) Inventors: Neil William Stewart, Glasgow (GB); Graeme Kerr Harkness, Edinburgh (GB); Douglas McPherson Little, Glasgow (GB)

(73) Assignee: Metaforic Limited, Glasgow (GB)

( * ) Notice: Subject to any disclaimer, the term of this patent is extended or adjusted under 35 U.S.C. 154(b) by 330 days.

(21) Appl. No.: 12/996,941

(22) PCT Filed: Jun. 12, 2009

(86) PCT No.: PCT/GB2009/050672
§ 371 (c)(1),
(2), (4) Date: Feb. 25, 2011

(87) PCT Pub. No.: WO2009/150475
PCT Pub. Date: Dec. 17, 2009

(65) Prior Publication Data
US 2011/0154503 A1    Jun. 23, 2011

(30) Foreign Application Priority Data
Jun. 12, 2008  (GB) .................................. 0810695.7

(51) Int. Cl.
*G06F 12/14*    (2006.01)
*G06F 21/12*    (2013.01)
(Continued)

(52) U.S. Cl.
CPC ........ *G06F 21/125* (2013.01); *G06F 12/0246* (2013.01); *G06F 12/145* (2013.01); *G06F 21/14* (2013.01); *G06F 2009/45583* (2013.01)

(58) Field of Classification Search
CPC ........ G06F 21/125; G06F 21/14; G06F 21/52; G06F 21/54; G06F 21/563; G06F 12/0246; G06F 12/145; G06F 2009/45583
(Continued)

(56) References Cited

U.S. PATENT DOCUMENTS 7,287,166 B1 * 10/2007 Chang .................... G06F 21/54
                                                    713/176
8,510,571 B1 *  8/2013 Chang .................... G06F 21/54
                                                    713/187
(Continued)

OTHER PUBLICATIONS

Giffin et al., Computer Security Applications conference, 21st Annual Tucson, AZ, IEEE, pp. 23-32 (Dec. 5, 2005) XP010869923.
(Continued)

*Primary Examiner* — Barbara Burgess
(74) *Attorney, Agent, or Firm* — Brake Hughes Bellermann LLP

(57) ABSTRACT

Program code is modified to execute correctly only when code and data memory accesses/fetches are synchronised, i.e. data and code accesses/fetches are routed to identical physical addresses in computer memory. This indirectly defeats the MMU attack, in which code and data memory accesses/fetches to the same logical address are routed to different physical addresses. The program code is modified such that one or more sections of the code ("repair targets") are deliberately broken so that the program code will not execute correctly, the repair targets being replaced at run time with correct code before the repair targets are executed.

19 Claims, 16 Drawing Sheets

(51) Int. Cl.
   *G06F 12/02* (2006.01)
   *G06F 21/14* (2013.01)
   *G06F 9/455* (2006.01)

(58) Field of Classification Search
   USPC .... 709/223, 224, 225, 226, 229, 232; 726/1, 726/2, 22, 23, 24, 25, 26, 29
   See application file for complete search history.

(56) References Cited

U.S. PATENT DOCUMENTS

| | | | | |
|---|---|---|---|---|
| 2003/0110387 | A1* | 6/2003 | Cowie et al. | 713/190 |
| 2005/0183072 | A1* | 8/2005 | Horning et al. | 717/140 |
| 2006/0101047 | A1* | 5/2006 | Rice | G06F 21/52 |
| 2006/0136745 | A1* | 6/2006 | Taylor | 713/187 |
| 2006/0230288 | A1* | 10/2006 | Fox | G06F 21/563 |
| | | | | 713/188 |
| 2007/0226795 | A1* | 9/2007 | Conti | G06F 21/74 |
| | | | | 726/22 |
| 2007/0294496 | A1* | 12/2007 | Goss | G06F 12/1408 |
| | | | | 711/163 |
| 2009/0172346 | A1* | 7/2009 | Sahita et al. | 711/208 |
| 2012/0147937 | A1* | 6/2012 | Goss et al. | 375/222 |

OTHER PUBLICATIONS

Somayaji et al., IEEE Transactions on Dependable and Secure Computing, vol. 2, No. 2, pp. 82-92 (Feb. 1, 2005).
Gang Tan et al., Information Hiding, [Lecture Notes in Computer Science], vol. 4437, pp. 216-231 (Jul. 10, 2006).
Kanzaki et al., Proceedings of the 27th Annual Intl. Computer software and Applications Conference, vol. CONF. 26, pp. 170-178 (Nov. 3, 2003).
Collberg et al., Technical Report Dept. of Computer Science University of Auckland, No. 148, pp. 1-36 (Jul. 1, 1997).
International Search Report, dated Sep. 25, 2009, issued in priority International Application No. PCT/GB2009/050672.
International Preliminary Report on Patentability, dated Dec. 14, 2010, and Written Opinion, issued in priority International Application No. PCT/GB2009/050672.

* cited by examiner

Thwarting an MMU attack by ensuring reads & writes
are mapped to the same location, using a 2-step repair.

METHOD OF PROTECTING COMPUTER PROGRAM CODE

CROSS REFERENCE TO RELATED APPLICATIONS

This application claims the priority of PCT/GB2009/050672, filed on Jun. 12, 2009, which claims priority to Great Britain Application No. 081695.7, filed Jun. 12, 2008, the entire contents of which are hereby incorporated in total by reference.

BACKGROUND OF THE INVENTION

1. Field of the Invention

This invention relates to a method of protecting computer program code; it can, for example, be used to defeat an attack, such as the 'MMU attack', in which code and data fetches to the same logical address are routed to different physical addresses.

2. Description of the Prior Art

In the field of software anti-tampering, a technique called "self-checking" is often used to ensure that a program's code has not been modified in any way. Self-checking systems typically perform runtime checksums (or hashes) on the code in memory and compare the results to the expected checksums, as obtained from an unmodified version of the program. A checksum or hash is an instance of a 'digest'. So, the generic case is where a self-checking system generates a digest of the code in memory and compares the result to the unmodified version of the code. A digest is a (typically small) representation of a set of data where small changes in the data cause large changes in the digest. A typical digest is between 32 and 2048 bits in size. FIG. 1 shows a self-checking system, with code checking other code.

Although self-checking can be quite effective, a recent technique, referred to as a MMU (Memory Management Unit) Attack or a TLB (Translation Lookaside Buffer) Attack, shows how existing self-checking systems can be completely defeated by fooling them into checking an unmodified copy of the program's code while the computer actually executes a modified (i.e. hacked) copy. This attack uses features of most processors (i.e. Central Processing Units (CPUs), graphics processing units (GPUs) etc.) which allow different types of memory access to be handled differently, such that data and code accesses can be distinguished from each other and re-routed to alternative physical addresses, even though they share the same logical address. This feature is usually implemented in a Memory Management Unit (MMU). However, this feature may also be implemented in systems that are equivalent to MMUs. For example, some CPUs might have simpler circuitry that is not referred to as an MMU, but which provides the necessary features we describe. MMUs can also exist as co-processors in some systems, usually in older CPUs.

Processors can distinguish between an access (also known as a 'fetch') of data and an access or fetch of code. Further details are given in Appendix 1. Self-checking systems are vulnerable because they run their checksums using a data fetch and not a code fetch. Note that a code fetch can only fetch code in the process of executing it, so there is no way to construct a self-checking mechanism from code fetches— they must always be data fetches. The MMU attack exploits this vulnerability by generating an unhacked, unmodified version of the code in physical locations associated with a data fetch. Hence, when the self-checking system runs its checksums, the system performs its checksum or checksums on the unhacked version of the code. But the code that executes will be the hacked code—this is accessed solely using code fetches, and not data fetches. The self-checking system is hence completely unaware of the presence of this parallel, executable version of the code, which has been modified by the hacker. The attack could also be done the other way round in some cases, i.e. re-route the code fetches and leave data fetches alone. In fact, both could be re-routed.

The easiest way to implement the MMU attack is per the first description, i.e. to make an unmodified copy that will be checked, and modify (hack) the original code. This is due to other difficulties with moving the code that is to be executed. However, these difficulties can be overcome somewhat, and do not even exist on certain programs and/or CPUs, so it is feasible to modify the copy and execute it, leaving the original as the untouched version which will be checked.

In cases where either version could be a copy, it is also feasible for both to be copies, i.e. the original is no longer used, and we have an unmodified copy (to be checked) and a modified (hacked) copy to be executed.

To re-cap, using the CPU (or other form of computational unit) feature of separate handling of code fetches and data fetches, the MMU attack can be implemented simply by re-routing data fetches to another memory location which contains an unmodified copy of the program's code. Since a self-checking system uses data fetches to perform checksums on the code to detect tampering, the code being checked will be this unmodified copy and not the code actually being executed. This is because the code being executed uses code fetches that will be routed to the modified (hacked) version of the code. FIG. 2 shows the re-routing of data fetches to thwart a self-checking system.

Although the concept of the MMU Attack is relatively simple, it is non-trivial to implement in practice since existing Operating Systems (OSes) do not typically allow the MMU to be configured in such a manner. As a result, this type of attack usually requires a kernel modification—this imposes a deployment burden on the end-user, which may limit the usefulness of this type of attack in some contexts. However, the rise in popularity of Machine Virtualisation stands to reduce this deployment burden, since end-users can deploy the attack on a guest OS without polluting their host OS. The host OS is the primary OS running on a machine, although this line is being blurred with the introduction of "nested" virtualisation. The guest OS is an OS running under virtualisation.

Machine Virtualisation is often referred to as Platform Virtualisation and there are several ways of implementing this, including "Full Virtualisation", "Hardware-Assisted Virtualisation" and "Para-virtualisation". They typically differ in terms of the level at which they virtualise a machine. For the purposes of the present document, however, the differences between these different ways of implementing Machine Virtualisation are not particularly significant. This is because the present document deals with a hardware feature which exists at a level in the system architecture below all these ways of implementing Machine Virtualisation.

A major problem with this type of attack is that it is likely to be impossible for an anti-tampering system to directly detect that the MMU has been configured in the manner described above. Even if it were possible, a hacker will typically be able to disguise or spoof this configuration on a per-case basis such that any specific anti-tampering system will not be able to detect it. By "directly detect", we mean querying the state of the MMU in order to determine that the memory pages used by the program code are set up to route data and code access to different physical locations. This might involve using an OS application programming interface (API) to obtain MMU access, and/or use of CPU registers, as well as accessing any in-memory data structures used to implement page-mapping by the MMU. Since this type of mapping is not generally supported by most OSes, it is likely that no OS API exists which provides the required information for the program to determine that the MMU Attack is present.

Overall, the widely held view is that no defence is possible against the MMU Attack. Reference may be made to G. Wurster, P. C. van Oorschot, A. Somayaji: "*A generic attack on checksumming-based software tamper resistance*". Technical Report TR-04-09, Carleton University, November 2004; see also G. Wurster, P. C. van Oorschot and A. Somayaji: "*A generic attack on checksumming-based software tamper resistance—Slides*" In *IEEE Symposium on Security and Privacy*, May 2005. pp 127-138; and also P. C. van Oorschot, A. Somayaji and G. Wurster: "*Hardware-assisted circumvention of self-hashing software tamper resistance*" *IEEE Transactions on Dependable and Secure Computing*, April-June, 2005.

OTHER BACKGROUND CONCEPTS

Software is said to be tamper-resistant when it contains measures to make reverse engineering harder, or to prevent a user from modifying it against the manufacturer's wishes (removing a restriction on how it can be used, for example). One commonly used method is code obfuscation.

Obfuscated code is source code or intermediate language that is very hard to read and understand, often intentionally. Some languages are more prone to obfuscation than others. C, C++ and Perl are cited as easily obfuscatable languages. Macro pre-processors are often used to create hard-to-read code by masking the standard language syntax and grammar from the main body of code.

Programs known as obfuscators operate on source code, object code, or both, mainly for the purpose of deterring reverse engineering, disassembly, or decompilation. Obfuscating code to prevent reverse engineering is typically done to manage risks that stem from unauthorized access to source code. These risks include loss of intellectual property, ease of probing for application vulnerabilities and loss of revenue that can result when applications are reverse engineered, modified to circumvent metering or usage control and then recompiled. Obfuscating code is, therefore, also a compensating control to manage these risks.

However, effective tamper resistance in software is much harder than in hardware, as the software environment can be manipulated to near-arbitrary extent by the use of emulation.

Trusted Computing (TC) is a technology developed and promoted by the Trusted Computing Group. The term is taken from the field of trusted systems and has a specialized meaning. With Trusted Computing the computer will consistently behave in specific ways, and those behaviors will be enforced by hardware and software. Enforcing this Trusted behavior is achieved by loading the hardware with a unique ID and unique master key and denying even the owner of a computer knowledge and control of their own master key. Trusted Computing is extremely controversial as the hardware is not merely secured for the owner; enforcing Trusted behavior means it is secured against the owner as well.

If implemented, trusted computing would make software tampering of protected programs at least as difficult as hardware tampering, as the user would have to hack the trust chip to give false certifications in order to bypass remote attestation and sealed storage. However, the current specification makes it clear that the trust chip is not expected to be tamper-proof against any reasonably sophisticated physical attack; that is, it is not intended to be as secure as a tamper-resistant device.

SUMMARY OF THE INVENTION

The invention is a method of protecting computer program code, in which the program code is modified to execute correctly only when code and data memory accesses/fetches are synchronised, i.e. data and code accesses/fetches are routed to identical physical addresses in computer memory.

The invention is, in one implementation, a method for indirectly defeating the MMU Attack in which code and data memory accesses/fetches to the same logical address are routed to different physical addresses. It does this by modifying the program being protected to operate in a manner which will only yield correct behaviour when data and code accesses are routed to identical physical memory addresses. If they are routed to different physical addresses, as happens with the MMU attack, then the program will behave incorrectly (including the possibility of a complete crash). We say that this approach "indirectly" defeats the MMU attack because the defence doesn't specifically access any MMU information via the OS or direct hardware queries. Incorrect behaviour is anything from a subtle bug which a user may never notice, through to a complete, unrecoverable program crash. When we talk about detection of the MMU attack, the code doing the wrong thing does not have to involve a crash, but could cause a memory location to be written to (or not written to) with a signal value (or a not-signalled value) to signify the presence of the MMU attack.

To achieve this behaviour, we modify a program such that one or more sections of its code are modified to yield a program which will not work as-is, i.e. these code sections (called repair targets) are deliberately broken. We then inject repair probes into the program, which replace these modified code sections with the correct code at runtime, each replacement occurring some time prior to the associated repair target being executed. When we use the term 'code', we include any binary executable code, as well as bytecode for Java and C #, or source code for scripting languages. Also, when we refer to 'injecting' code, we mean injecting into the source code, but this can be generalised to cover injection into a binary executable, bytecode or any other suitable form of program representation.

The technique of using repair targets and repair probes may also be used as part of a shared library protection scheme. With most OSes, an application can place some of its code in shared libraries which are dynamically loaded and linked into the application at runtime. In Windows, these shared libraries are called Dynamic-link libraries (DLLs); in Unix/Linux, they are called dynamic shared objects (DSOs). When protecting code in a shared library, one approach is to check the contents of this shared library in memory, where the code performing the checking is in another module (the main executable or another shared library).

Since hackers have more opportunity to pervert the links between separate modules than is possible within a single module, we need to ensure that the code being checked across such links is the code that will also be executed across them.

The same mechanism of repair/damage nodes can be used to ensure that any code across such a link is the code being both executed and checked, in the same manner described for the MMU defence.

Dynamic repair nodes (described later) can also be combined with the anti-tampering system, or rather, they can be combined with our anti-tampering system. As described in this document, dynamic repair nodes convert a function parameter into a code modification as a means to thwart the static resolution of repairs by a hacker. Similarly, our anti-tampering system can convert checksum results into code writes such that the code only executes correctly if the checksum is correct. These two schemes can be combined such that the code writes serve both purposes simultaneously.

With this in place, the program will now function correctly in normal circumstances. However, if the program is subjected to the MMU Attack, the code replacements will only be routed to the unmodified, non-executing copy of the program, and therefore the hacked code being executed will not be replaced and the program will misbehave because the correct code will be missing from the hacked code being executed. This is because the code replacements use data fetches, not code fetches, and data fetches are routed to the unmodified version of the code.

We also envisage an extension to the MMU Attack (i.e. this is what a hacker may attempt when faced with our defence) which attempts to thwart our defence by further splitting memory accesses, making data reads and writes separate, such that data reads are routed to the original, unmodified code, and data writes are routed to the hacker's modified copy of the program, causing repairs to be made to the code actually being executed. Our solution also incorporates a defence against this extended attack approach.

With our solution in effect, a hacker wishing to deploy the MMU Attack has the following options available to him:

Find a way to build the code replacements into his modified copy of the program, such that his modified copy is based on fully working code.
  Although this is possible, we make this hard to achieve in practice through a combination of techniques.
Implement a mechanism which can route data writes to both copies of the program, such that the repair targets on both copies are fixed simultaneously.
  No existing MMU hardware is known to provide such functionality, so the hacker currently has to implement this in software by making data writes to program memory pages generate an exception which can then write the same data to both copies of the program. This will typically have a significant impact on the program's execution speed, and we do not consider it a practical attack.

We have further extended our solution to support the following:

Actually detecting the MMU Attack via our indirect, non-detecting mechanism.
A special type of repair node—a "dynamic repair node"—which cannot be simulated by static code replacement, thus making it harder for a hacker to remove.

The invention is also novel in terms of the philosophy and approach we have used to design and implement it. The typical approach used in the anti-tampering field is to devise a "detect and respond" solution: the detect and respond approach is as simple as it sounds: detect an attack or unwanted behaviour and respond by stopping the program or taking some other retaliatory action. We do not do this. Instead, our philosophy leads us to first investigate methods which make it hard for a hacker to deploy his attack, either by using resources that he needs to implement the attack, or by making the program behave in a manner which is incompatible with his attack at some fundamental level. A resource is any computing resource—hardware or software—that can be used by a program, including registers, interrupts, instructions, memory, OS code, and so on. Making the program behave in a manner which is incompatible with an attack can take many forms, including the specific form we describe as the preferred implementation of this invention. Indeed, it can be argued that the use of resources (the former approach) is a form of this.

It is the latter approach which we have found to be most effective in this case—by making the program behave in a manner which relies on code and data accesses being routed to the same physical addresses, we make the program fundamentally incompatible with the behavioural change caused by the MMU Attack. A further invention envisaged in this specification is therefore a software program anti-tamper technique including the steps of (a) using resources that are needed to implement an attack or (ii) making the program behave in a manner that is incompatible with the attack.

SUMMARY OF TECHNICAL ADVANTAGES

1. The approach explained in this document is the only known defence against the MMU Attack. All self-checking anti-tamper systems will need a defence like this (or with similar capabilities) in order to remain effective.
2. The approach explained in this document defeats the MMU Attack indirectly, which gives the hacker little scope to eliminate the defence easily (e.g. spoofing is unlikely to be of any use. Spoofing is a common hacker technique where the hacker re-routes a program's use of legitimate resources through his own code, where he can modify the way the resource is used and/or modify any information returned from the resource. For example, a hacker may spoof an OS function which returns today's date such that it returns some other date instead.)
3. The approach explained in this document defeats a possible extended form of the MMU Attack which has not been seen in practice at this time.
4. The approach explained in this document has no single point of failure—the mechanism is effectively distributed in time and space, and the hacker must defeat all instances in order to re-enable the MMU Attack.
5. Although the defence mechanism defeats the MMU Attack indirectly, it can also be used to detect the attack.
6. All possible, practical defences against the MMU Attack are likely to be fundamentally similar to this approach. This approach uses the fundamental nature of the MMU attack's impact on the low-level semantics of a program against itself. Since the MMU attack causes data and code fetches to be separated, we construct code using data fetches such that if they are separated, the code will not be constructed correctly and will thus behave incorrectly. In other words, we literally use both data and code fetches on the same memory locations in order to expose the low-level behaviour of the machine's memory sub-system when the MMU attack is present. Other mechanisms which strive to achieve a similar exposure must also use some form of synchronised data and code fetches on the same memory locations, even though the precise configuration of fetches may differ, and are hence within the scope of this invention. All other conceivable ways to detect or defend against the MMU attack (which do not use the exposure described above) will not have the property of being fundamentally incompatible with the behaviour of the machine when the MMU attack is present and, as such, it is likely that a hacker will find a way to defeat any such methods. It is therefore unlikely that any such methods will constitute a practical defence.

Other aspects of the invention are:
A computer implemented system for protecting computer program code, in which the system is operable to perform the method described above.
A computer software program stored on computer readable media that, when executed on a computer, enables the computer to perform the method described above.
A computer software program that has been modified by the computer implemented system described above or the computer software program described above so that it is continuously defended against attacks in which code and data fetches to the same logical address are routed to different physical addresses.

DETAILED DESCRIPTION

Fundamentals

Figure 1:
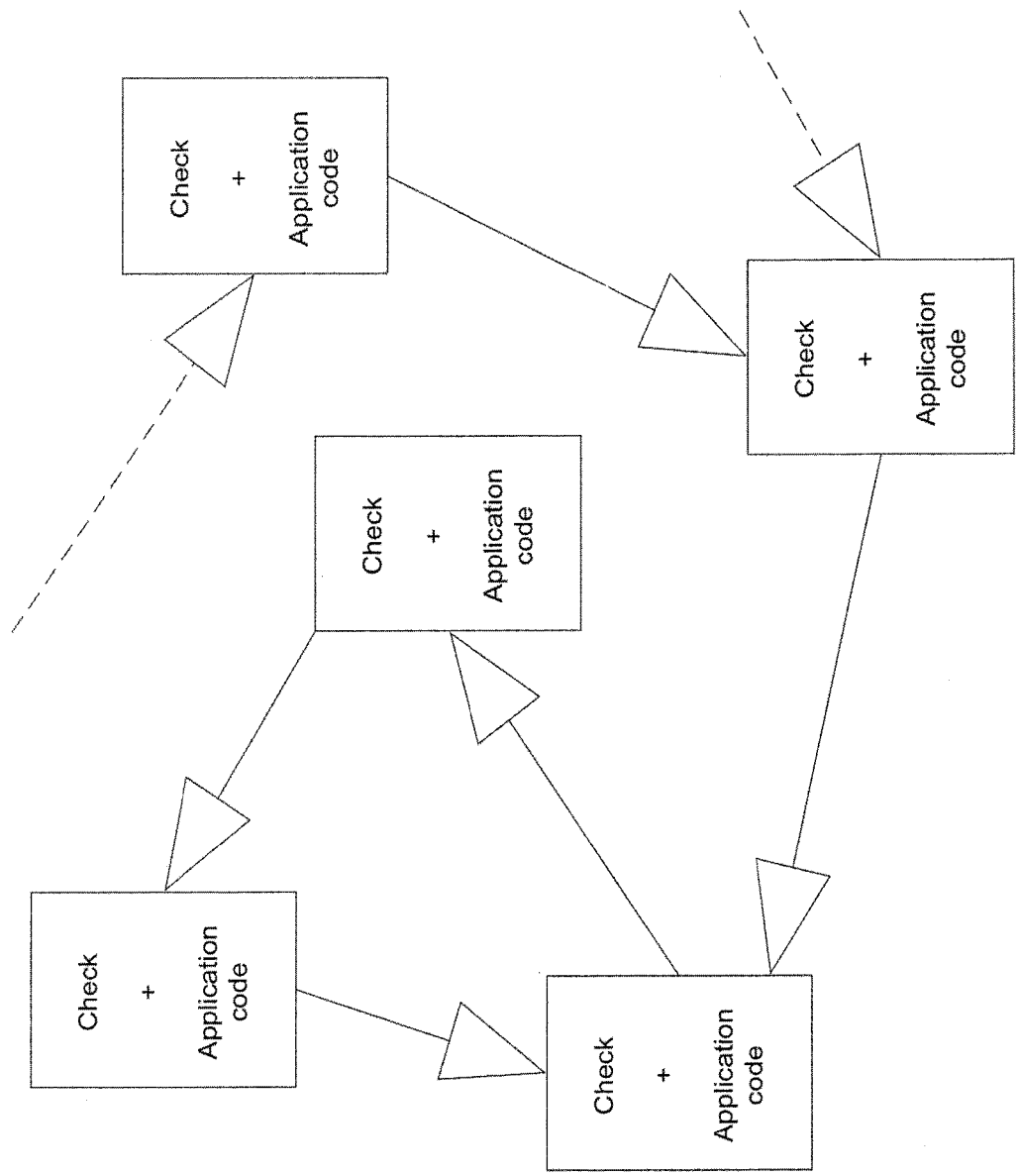
FIG. 1 shows a self-checking system, with code checking other code.
Figure 2:
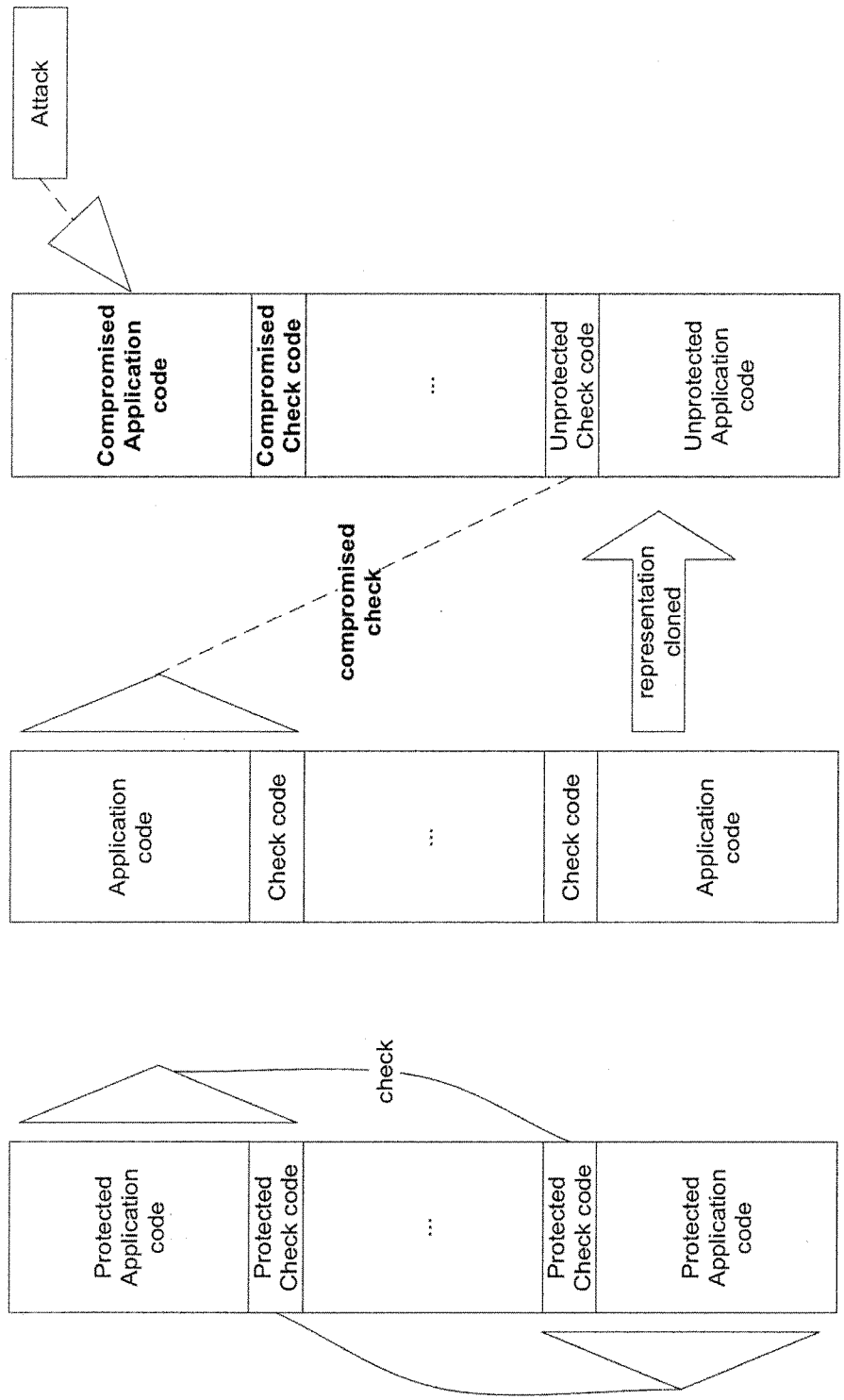
FIG. 2 shows the re-routing of data fetches to thwart a self-checking system.

The defence against the MMU Attack operates on the notion that, since the attack needs to change the behaviour of the protected program in some fundamental way (even if it does not have any apparent, higher-level impact), it should be possible to make the program incompatible with such a change.

In the case of the MMU Attack, the processing environment in which the program executes is changed such that code and data accesses of the same logical addresses are routed to different physical addresses from each other. The term 'processing environment' means the fundamental state of the computer system the program is running on. Although this change does not impact the apparent behaviour of a typical program, it does cause different low-level behaviour. As explained above, under the MMU attack, the data access used by the self-check system is routed to the unhacked code, so the self-check fails to indicate tampering. But the code access, used in executing code, is routed instead to the hacked code. But it is possible to construct a program which is incompatible with such a change in behaviour, i.e. in which code and data accesses of the same logical addresses are routed to different physical addresses from each other.

As an example, consider the following Intel x86 instruction (any mention of "Intel x86" assembly language generally means the Intel 80386 and later CPUs, although "x86" is a commonly-used term for that family of CPUs):

```
mov eax, ABCD1234h
```

This instruction moves the hexadecimal value of ABD1234 into the eax register. Both the instruction and the value to use are fetched by the CPU as code fetches (as opposed to data fetches), and the instruction will behave the same under the MMU Attack as it will under a normal execution environment.

Whatever mapping from logical to physical address is associated with the code above, only the instruction fetch part of that mapping will be used, since only a code fetch occurs here. Even if the MMU attack is present and has mapped data fetches of this instruction's logical address to a different physical address from that used by the code fetch, it will have no impact, since no data fetches are involved here.

Now consider the following code:

```
mov ebx, FFFF0000h
lea esi, DWORD PTR[label + 1]
mov DWORD PTR[esi], ebx
label:
    mov eax, ABCD1234h
```

The mov instruction from before is still present here (as the last instruction), but before it can execute, the code before it modifies the instruction to use a value of FFFF0000 instead of ABCD1234, thus causing the instruction to move FFFF0000 into eax. The first 3 lines of code modify the actual program code of the last instruction. This is usually called "self-modifying code".

If this code is executed under a normal execution environment, we would expect eax to contain the value FFFF0000 at the end of this piece of code. However, if the execution environment has been modified such that data accesses (as opposed to code accesses) are routed to another copy of the program that is not executed, the instruction that actually gets executed at the end will not have been modified, and eax will be given the value ABCD1234, which is not what our program was designed to do. It will not have been modified because the data write used to modify it will have been routed to the other copy of the code, not the one that we are about to execute. So the modification does occur, but not in the code that we actually execute. Since the original code used a value of ABCD1234, that's what gets used if the MMU attack is present, which is the wrong value in this case, since we wanted to modify it to use a different value. The resulting incorrect value may have a subtle effect on the behaviour of the program, or it may have a catastrophic effect, depending on how the value is used.

Figure 3A:
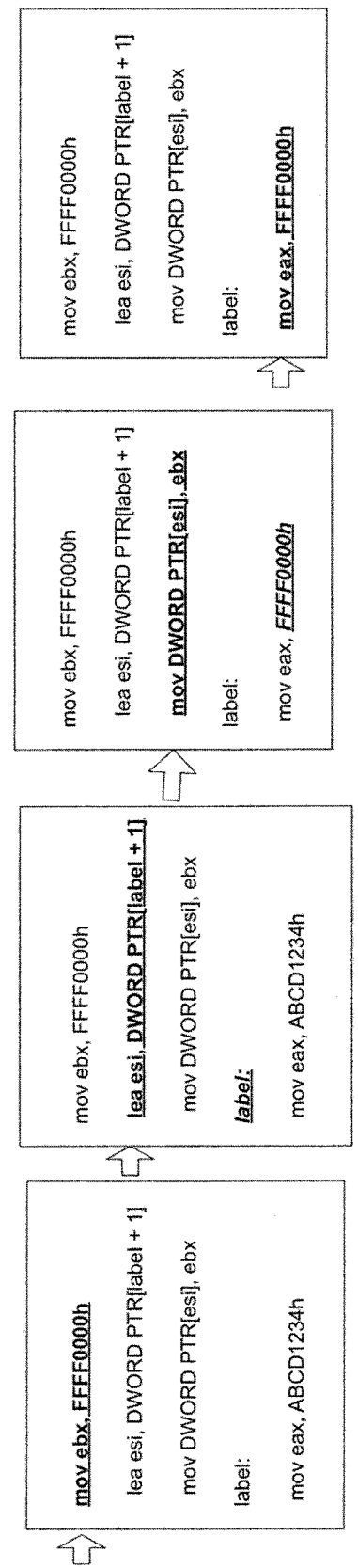
FIGS. 3A and 3B shows the effect of code in a normal execution environment and in an environment where code and data accesses are routed differently.
Figure 3B:
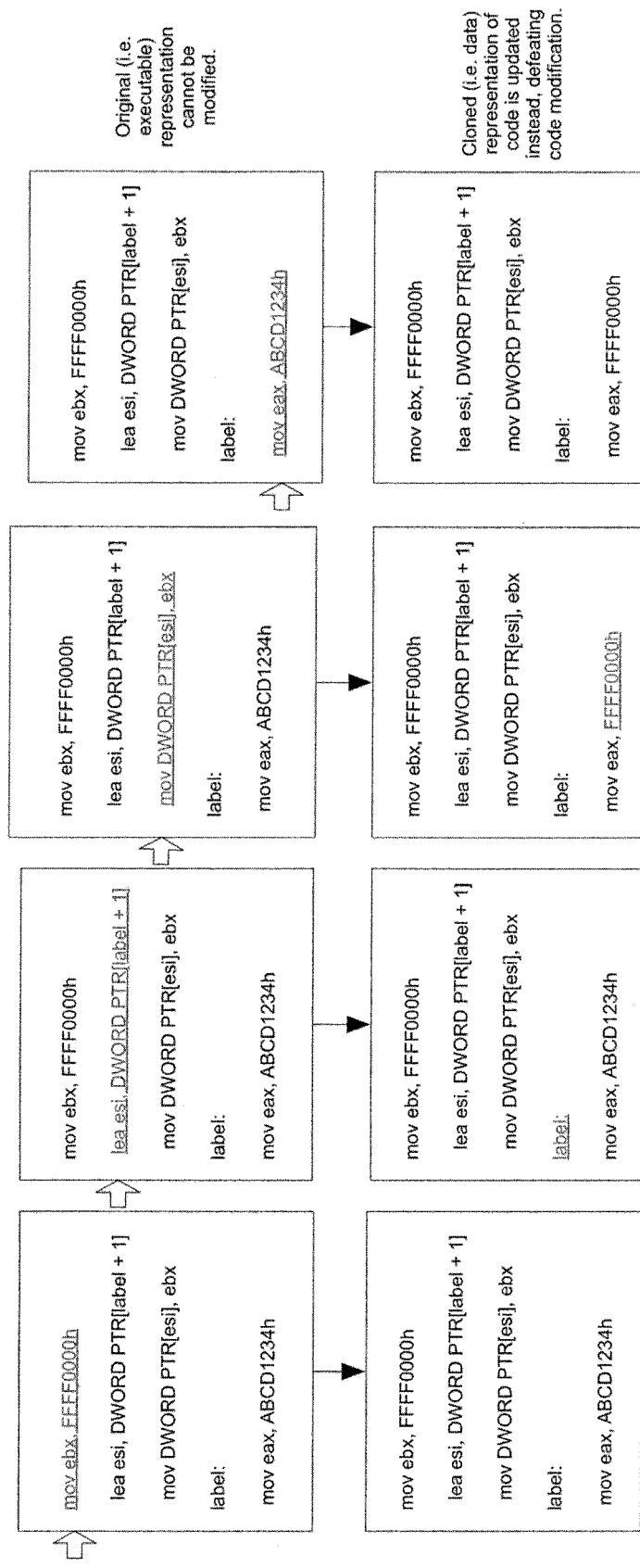

FIGS. 3A and 3B show the effect of code in a normal execution environment and in an environment where code and data accesses are routed differently. This example shows how a simple form of self-modifying code can cause a program to fail when it is executed in an environment where code and data accesses have been separated and hence not synchronised—i.e. where different physical addresses are used for code and data accesses that share the same logical address. This technique forms the basis of our defence against the MMU Attack: code and data accesses have to be synchronised in an implementation of this invention—i.e. the mapping between physical as well as logical addresses must match. If they do not, as will occur in a MMU attack, then the executed, hacked code, will not perform correctly. So to be clear, the logical and physical addresses do not need to match each other (they rarely will in practice), but the mapping between logical and physical addresses must be the same for code fetches as they are for data fetches.

For example: A logical address of 400,000 might map to a physical address of 800,000. However, if that is only true for code fetches, whereas data fetches at logical address 400,000 are mapped to a physical address of 900,000, then the two are not "synchronised" in our definition.

Generalising the Technique

We have generalised the technique used in the simple example above by recognising that all program code is simply a form of data. Although we modified the value used in the mov instruction, we could instead have modified the instruction itself. Indeed, there is no need for the original copy of the instruction to be a mov instruction at all—it could consist of random data, since we replace it with the correct instruction before it is executed. By the term 'random data', we mean "any set of data values", not specifically data generated by a random number or pseudo random number generator.

With this in mind, we can use the self-modifying code technique on any piece of program code, with little regard to its contents. For any given piece of code, we overwrite some number of bytes of code with incorrect values—we call this code a repair target—and then inject another piece of code—a repair probe—which replaces these incorrect values with the correct ones at runtime, some time prior to the repair target being executed (probe placement is discussed in more detail later). The incorrect values can be anything except the correct ones (obviously) or values which would yield code execution that has an identical effect (i.e. if there are multiple ways to express the same functionality on some CPUs). We call this combination of a repair target and repair probe (and any other associated elements) a repair node.

Figure 4:
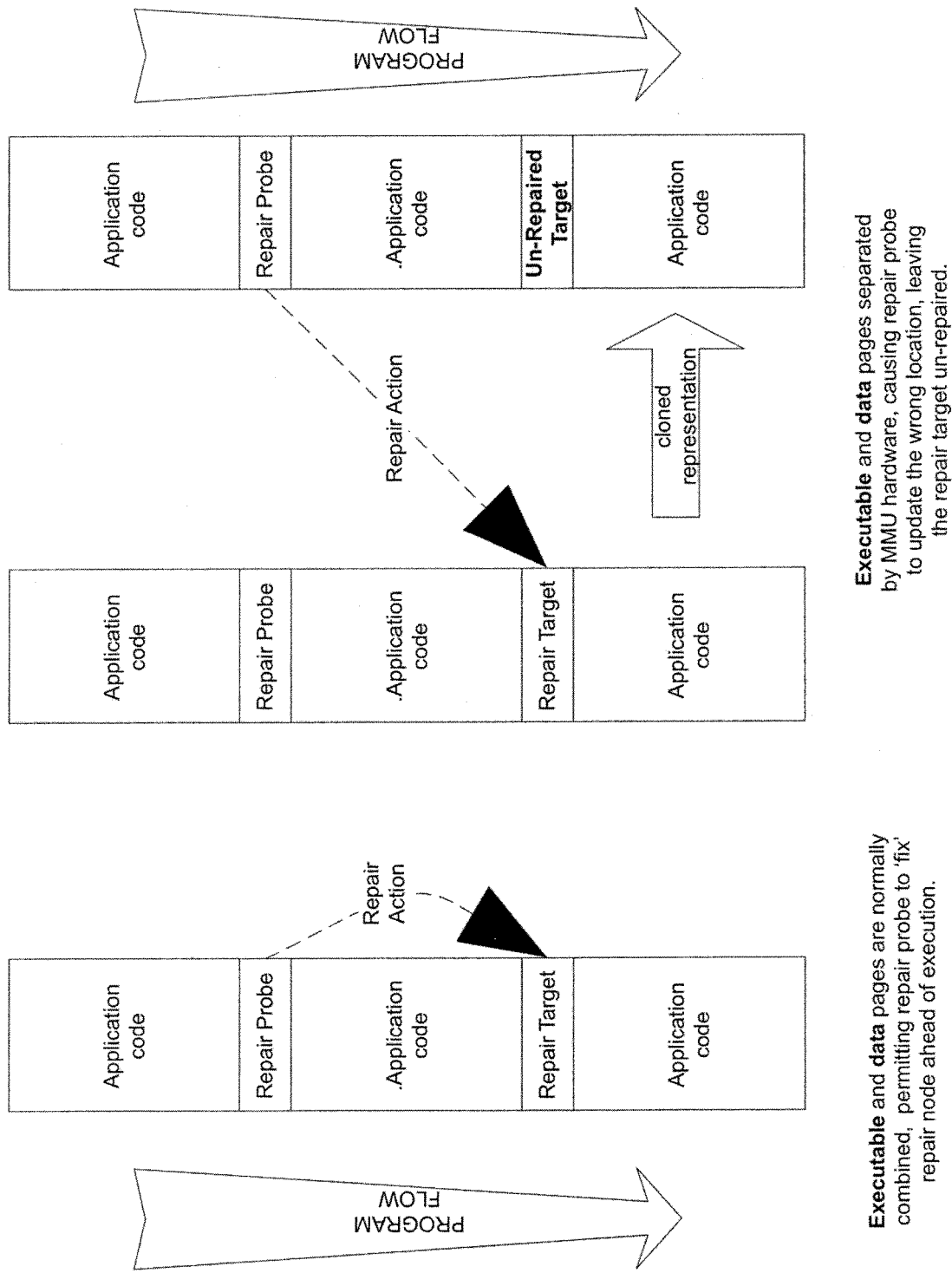
FIG. 4 shows the structure of a repair node (repair target and repair probe) on general code.

FIG. 4 shows the structure of a repair node (repair target and repair probe) on general code. Using this generalised approach, we can easily apply the technique any number of times anywhere within the target program.

Handling MMU Read & Write Distinctions

On computer systems with MMUs that can distinguish between data reads and writes, and where this can be used to re-route data reads and writes to separate physical locations, the repair node scheme as described above could be worked around by a hacker with an extended form of the MMU Attack.

Figure 5:
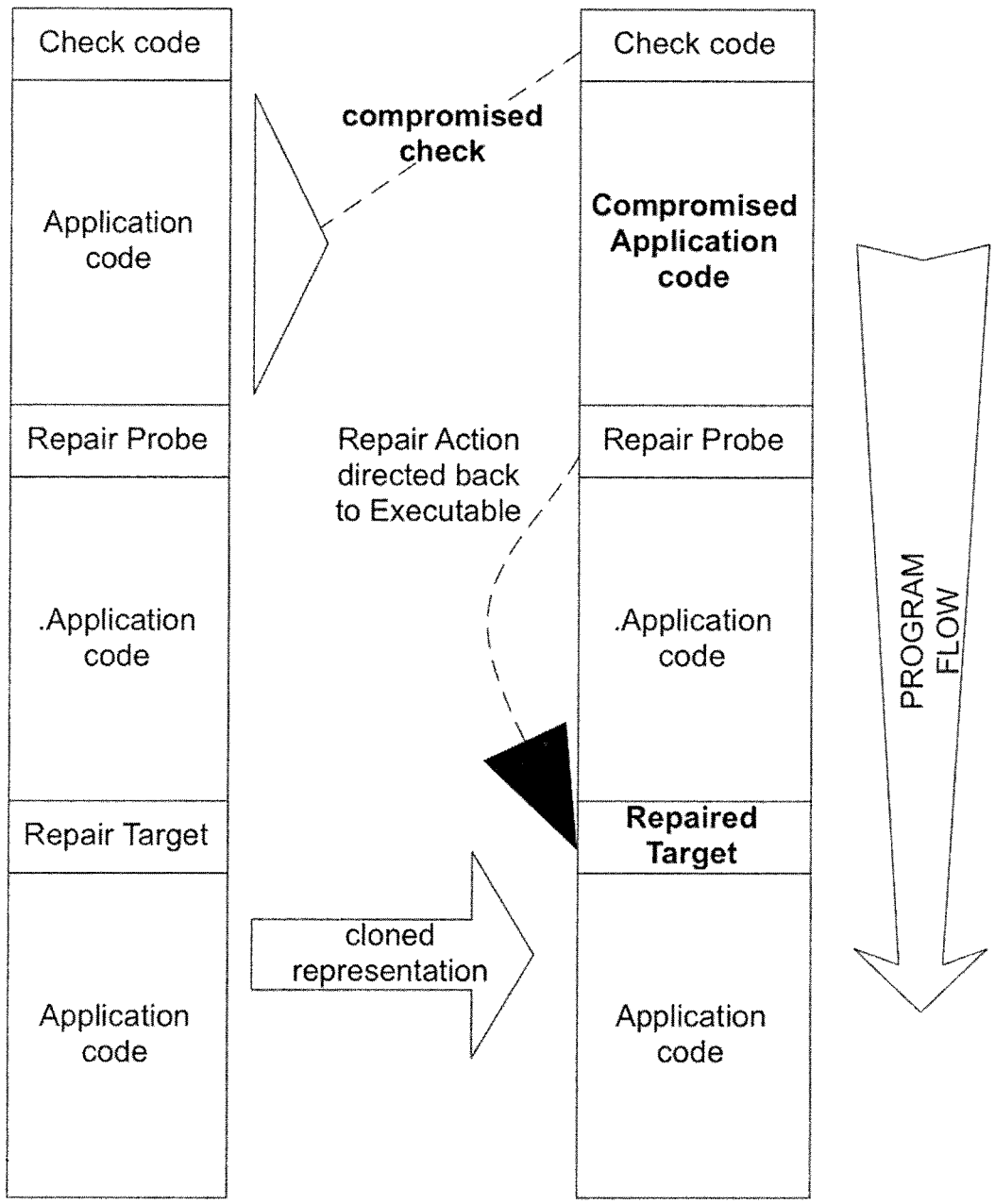
FIG. 5 shows data read and write separation to defeat the basic defence.

To do this, the hacker could route data writes to the same physical location as instruction (i.e. code) fetches and continue routing data reads to the unmodified copy of the program. With this mapping, repair probes will repair the hacker's modified copy of the program, and since this is the copy of the program being executed, the program will run correctly. FIG. 5 shows data read and write separation to defeat the basic defence.

We have extended our scheme to defend against this attack, using the same philosophy which gave rise to the original defence. Instead of just requiring that data and code/instruction accesses are routed to the same physical locations for the program to operate correctly, we impose a more specific requirement: that data reads, data writes and instruction fetches are all routed to the same physical locations as each other for the program to operate correctly. This is a core insight and an aspect of the present approach.

We achieve this by introducing repair probe variants which both read and write program code in order to achieve their goals, where at least one of the writes is dependent on one of the reads.

For example, if we have a repair target which is 2 bytes in size, a simple approach would be for the associated repair probe to write the 2 bytes of correct code onto the repair target in reverse order and then perform a subsequent reversing operation on the 2 bytes of repair target memory. (The repair target memory is also referred to as the "repair target.") By doing this, we make the code that is finally placed in the repair target dependent on where both data reads and writes are routed. If data reads are routed to the original, unmodified code, but data writes are routed to the hacker's modified copy of the code, then the following will happen for the example above:

1. The initial write of 2 correct bytes will be routed to the hacker's copy of the code. These will be in reverse order, and thus incorrect at this stage.
2. The read of 2 bytes for the final reversing operation will fetch the 2 bytes from the original (unfixed) code, not from the (correct and reversed) 2 bytes in the hacker's copy of the code.
3. The final write of 2 bytes after the reversing operation will write the 2 bytes of original (unfixed) code into the hacker's copy of the code.
4. The hacker's copy of the code will fail to run correctly.

Figure 6:
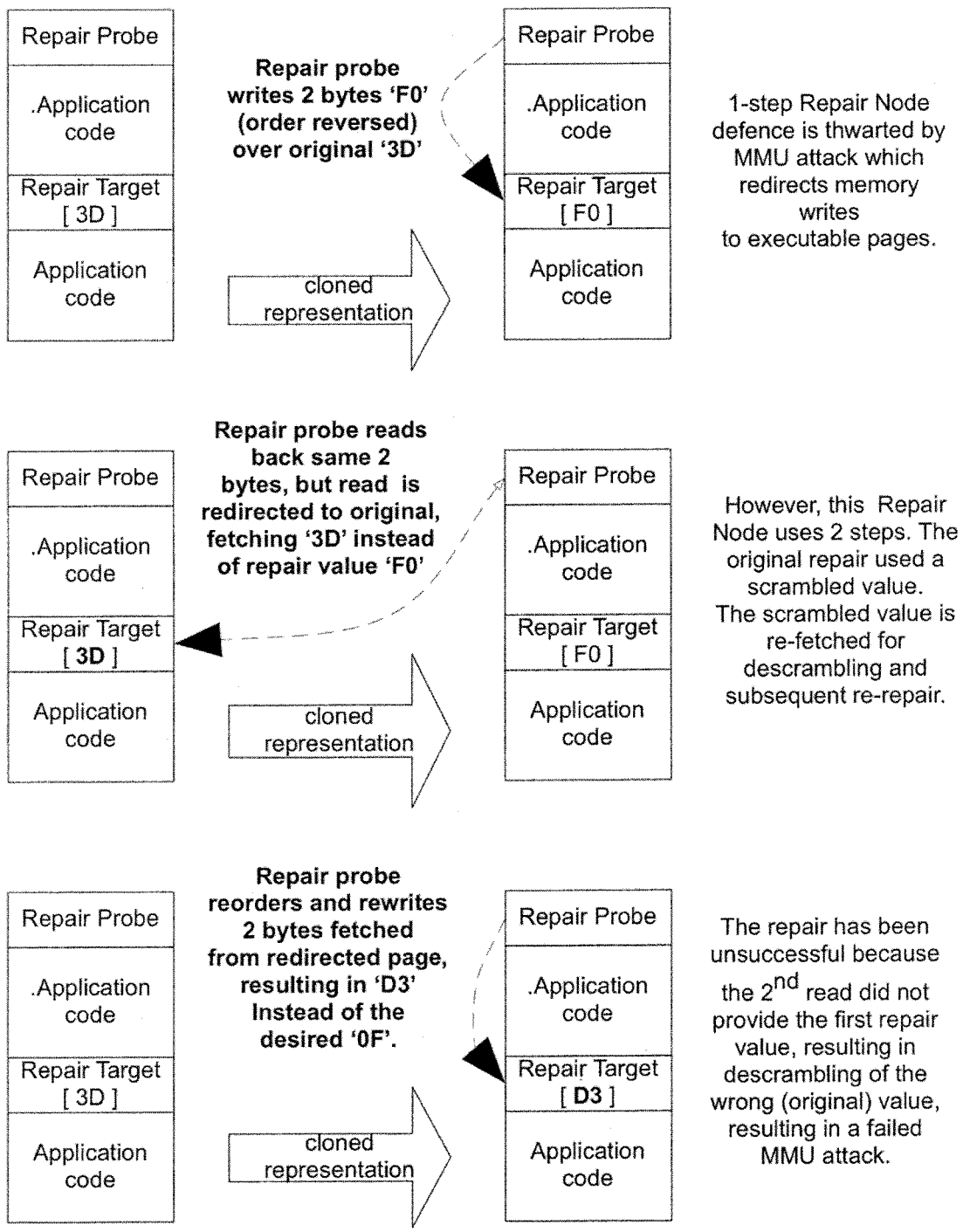
FIG. 6 shows the sequence illustrating the defeat of a MMU attack.

FIG. 6 shows the sequence illustrating the defeat of a MMU attack. The byte-reversing operation we describe is only one example of the general principle in use here, which is to write some code into the repair target, then read some of that same code back again and then write it back again (possibly to a different place, possibly modified in some way), thus making some of the final code written to the repair target dependent on a write-then-read sequence which requires both data reads and writes to be routed to the same physical locations for the values to be preserved. In practice, we use a large number of variants of this scheme to stop a hacker finding repair probes via pattern-based searching.

The meta-rule here is that the first write must not contain the final (correct) data—this must be constructed in a subsequent read-write operation. The reversing operation ensures this by first writing the bytes into the wrong positions and then reversing them by reading them back and writing them to their correct positions.

As well as reversing the bytes, any wrongly-ordered write followed by reading the data back and then writing it back in the correct order will achieve the same effect. Examples include: swapping odd and even bytes (or any size, e.g. words or even at the bit level) and then fixing them; and writing in a random order and then fixing them.

Instead of using an incorrect order at first, the data could be written wrongly and then fixed on a subsequent read-modify-write pass. For example, we could subtract one from each value written before writing it, and then perform a second pass over each value, incrementing it by one (an increment needs to read, modify and write the value) to yield the correct values for each part of the data. Other examples of such modifications include: subtracting any number (or series of numbers) from each value and then adding the subtracted amount back on in a subsequent pass; the same, but for addition then subtraction; exclusive-or (xor) any number with each value before writing it and then xor the values again on a subsequent pass (a double xor with any value yields the original value); flipping one or more bits in each value written, followed by unflipping those bits in a subsequent pass; and any other reversible arithmetic, logical or bitwise operation applied to each value before writing it, followed by a subsequent pass which reverses the operations by reading, modifying and writing the previously stored value. Any combination of the above methods could also be used within a single repair node.

Interaction with the Anti-Tampering System

The naïve injection of repair nodes into a program protected by an anti-tampering system is likely to cause problems with program functioning, primarily because the anti-tampering system is designed to stop the types of program modifications which repair nodes rely upon. It is therefore necessary in most cases for the underlying anti-tampering scheme to be modified to support repair nodes.

Figure 7:
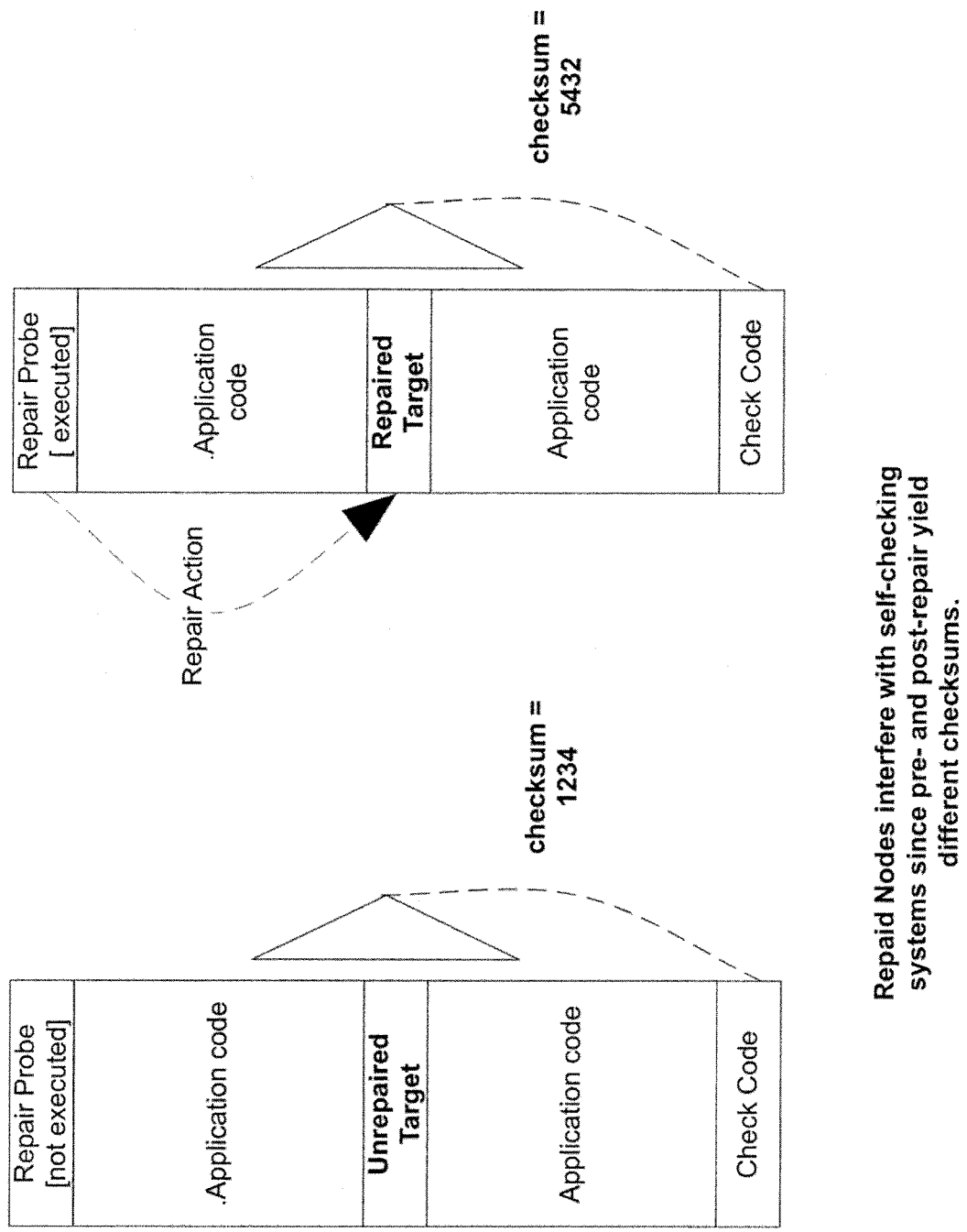
FIG. 7 shows self-checking system covering a repair target, with different checksums; being yielded before and after repair has occurred

The approach may be implemented in the presence of a self-checking anti-tampering scheme which determines code integrity by comparing the contents of code in memory against expected values (typically via checksum comparisons, although other comparison schemes might also be used). For any scheme of this type, it is typically assumed that no program code will ever be legally modified. Since repair probes (and damage probes) do change the code, however, this assumption is false for those regions of code which are addressed by repair nodes, and so a typical self-checking anti-tampering scheme will detect illegal program changes when repair nodes are in operation within it. Note that this is not necessarily guaranteed. Depending on the self-checking system, not all code changes will be detected immediately, and some temporary code changes may not be detected at all, if they are short-lived enough. FIG. 7 shows self-checking system covering a repair target, with different checksums; being yielded before and after repair has occurred.

There are a number of solutions to this problem, including the following:
1. Extend the self-checking system to allow areas of code containing repair targets to match two checksums, one covering the code before it is repaired and the other covering the code after it is repaired.
2. Construct the self-checking and repair node schemes in tandem, such that the self-checking scheme only ever sees either pre-repair or post-repair code for any given repair target.
3. Construct the self-checking scheme such that it does not cover repair targets, allowing the code contained in a repair target to change arbitrarily without triggering the self-checking mechanism.

With the first solution, a match of either of the two valid checksums will satisfy the self-checking system that the code is valid. For a single repair target within a checked area of memory, this seems like a reasonable solution with a known, limited cost. However, each addition of a repair target to an area of checked memory doubles the number of valid checksums to check against, since each repair target can have two values; this assumes that each repair target within an area of memory can be in a repaired/un-repaired state independently of the other repair targets in that area of memory—this is likely to be a valid assumption in practice.

It is therefore important that the number of repair targets present within any area of checked memory is kept as low as possible, possibly even as low as a single repair target. To accommodate this, the self-checking mechanism must be made aware of repair target locations such that it can structure the areas of memory it checks to only contain a small number of repair targets.

Not all self-checking mechanisms can be made to accommodate this restriction. The mechanism we use does allow for this, although it has an impact on the number and size of the checking areas used by the self-checking mechanism, which can, in turn, negatively impact the quality of the self-checking topology it produces. For example, our self-checking mechanism can produce checks which cover several functions (or even many functions) within a single area of checked memory. If each of these several functions were to contain a repair target, such a multiple-function check would not be possible on them if we restrict the number of repair targets per checked area of memory to one.

It is for this reason that this particular solution is not preferred for use together with our specific self-checking mechanism, but we suggest that it may be an appropriate solution for use with other self-checking mechanisms.

For the second solution, ensuring that the self-checking system only ever sees pre-repair or post repair code requires either that we introduce further function order guarantees, such that checks only occur when the associated code is guaranteed to be in the expected state (either repaired or not repaired), or that we make the self-checking system force the associated code into the expected state before performing the check (effectively placing copies of the repair/damage probes into the checks). The former approach may be too complicated to realise in practice, since it requires extensive, reliable knowledge of function execution orderings across the entire application. The latter approach, by contrast, is much simpler to realise, since it is agnostic of function ordering concerns; however, placing repair/damage probes into the checks may make them easier for a hacker to find, which could significantly reduce the efficacy of the entire scheme.

The complex nature of the former approach and the unknown impact on efficacy of the latter approach means that these approaches are not preferred. It is possible that there is no appreciable drop in efficacy with the latter approach, so we suggest this solution for that reason.

Figure 8:
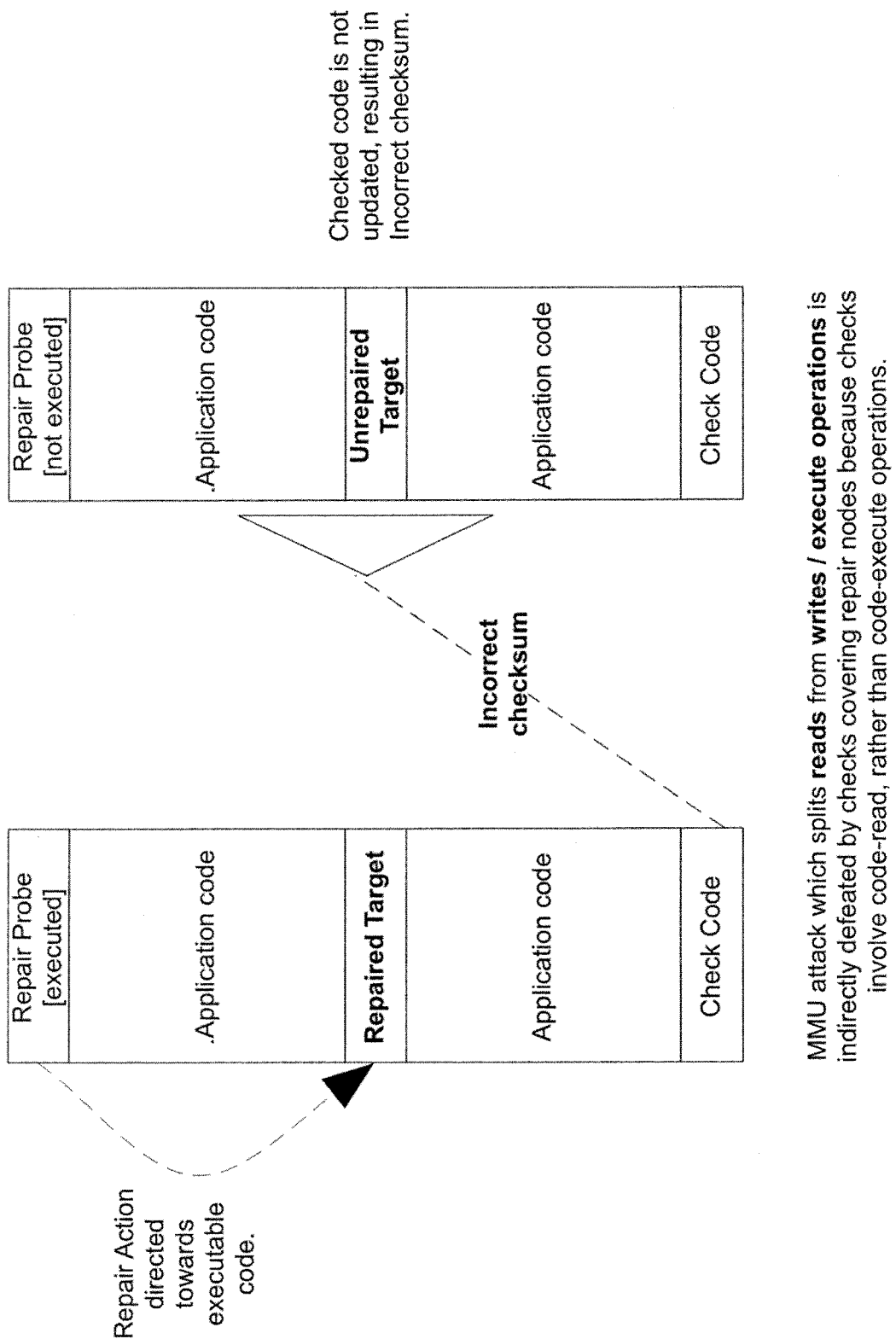
FIG. 8 shows how the extended MMU attack can be defeated by checking repair-nodes.

Interestingly, the second solution does have one advantage in that it is immune to the extended MMU Attack which splits data reads and writes (albeit only when the self-checking scheme expects to see post-repair code), because repairs will never be written to the version of the code that will be read for checking, and thus post-repair code will never be seen by the self-checking system. Although this is a useful property, it is not enough by itself to make this the most attractive solution. FIG. 8 shows how the extended MMU attack can be defeated by checking repair-nodes.

Due to its relative simplicity, we use the third solution (avoiding checking repair targets) as the preferred solution in our self-checking anti-tampering scheme. With this solution, we modify the self-checking mechanism such that it does not check repair targets, either by skipping over them, or by arranging the areas of memory checked by the self-checking mechanism such that they terminate on either side of any repair targets. It is important to note that this solution requires a change to the self-checking scheme (which could be any self-checking scheme), but not to the defence mechanism implementation. The other two solutions also require changes to the self-checking scheme, but alongside changes to the defence mechanism implementation.

It should be noted that the preferred solution requires a change to the self-checking mechanism (which could conceivably be any self-checking mechanism). In fact, the preferred solution only requires a change to the self-checking mechanism (i.e. it should avoid checking repair targets), and not the approach described here, which simply uses repair targets as desired, in the knowledge that the self-checking mechanism will avoid checking them.

Figure 9:
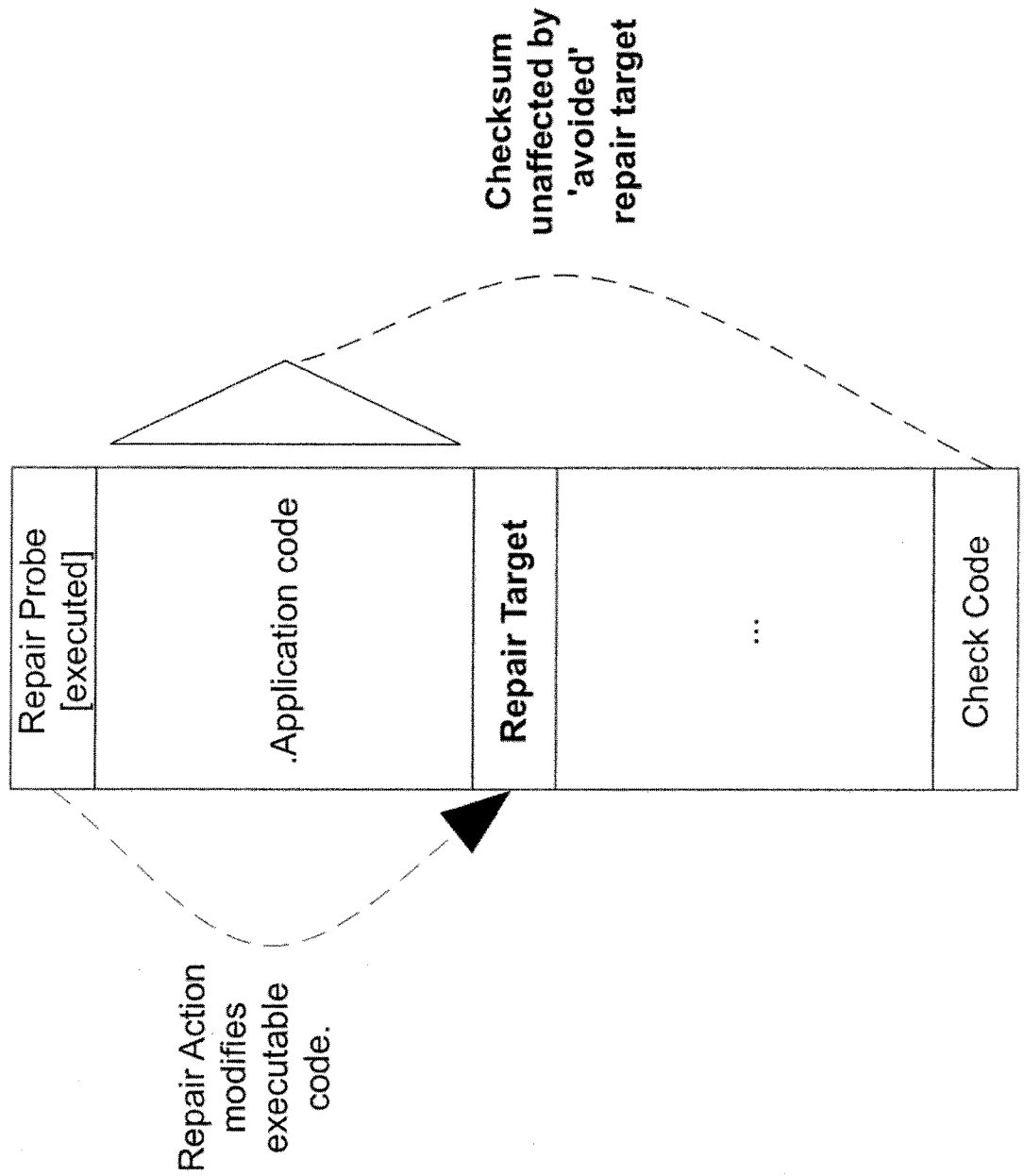
FIG. 9 shows checks avoiding repair targets.

This point is noted because we are describing a solution which operates in the domain of the self-checking system, where the self-checking system is not the defence mechanism. In fact, since the defence mechanism can be applied to any self-checking mechanism, the self-checking mechanism is not even necessarily in the domain of our specific self-checking mechanism. FIG. 9 shows checks avoiding repair targets.

One criticism which may be directed against this approach is that it effectively removes the anti-tampering protection from the code in repair targets, but this is countered by the repair mechanism itself, i.e. any illegal modifications made (by a hacker) to the code in a repair target will be replaced (with the original code) by a repair probe just before it is executed, so repair targets are effectively immune to modification anyway.

Another potential problem with this solution is that it requires the self-checking scheme to either "skip over" the repair targets or structure the areas being checked such that they are woven around the repair targets, which may place some limitations on the structure of the areas being checked. However, neither of these has proven to be a significant problem for our self-checking scheme. Indeed, our self-checking scheme was already constructed to allow portions of code to be skipped over for other reasons, and this has not compromised the strength of the self-checking scheme in any noticeable way.

For example, our self-checking system allows the use of interleaved memory areas, where the memory being checksummed is not a simple, contiguous block of memory, but may instead checksum some number of bytes, then skip some other number of bytes, then check some other number of bytes, and so on until the end of the memory area is reached. The number of bytes checked and skipped may be constant across a memory area, or they may vary, in some cases randomly, and in other cases, dependent on the current checksum value being constructed.

With this mechanism, we can construct an interleaved area of memory to be checked that skips over one or more repair targets, simply by adjusting the start address and/or the interleaving parameters such that the repair targets in question happen to be skipped over as part of the interleaving process. Since we perform this type of interleaving as a matter of course with our self-checking system, using it to also avoid repair targets does not significantly impact the code checking coverage we can achieve.

Resilience to Attack

With our solution in effect, a hacker wishing to deploy the MMU Attack has the following options available to him:
  Find a way to build the code replacements into his modified copy of the program, such that his modified copy is based on fully working code.
  Implement a mechanism which can route data writes to both copies of the program, such that the repair targets on both copies are fixed simultaneously.

We can make these remaining attack options hard to achieve in a number of ways, such as by:
  1. Using a large number of repair nodes.
  2. Making each repair probe relatively unique.
  3. Disguising the incorrect code placed in a repair target such that it blends in with the surrounding code.
  4. Placing repair probes such that they are executed a short time before their associated repair targets, but not immediately before.
  5. Placing some proportion of repair nodes in code which is executed infrequently.
  6. Adding "damage probes" which undo the repairs made by repair probes after the repair target is executed.

Large Number of Repair Nodes

By using a large number of repair nodes distributed throughout a program, we make it difficult for a hacker to eliminate all of them by hand. For example, 1000 nodes would require a fairly impractical level of manual effort on the part of a hacker if each node required 10 minutes (for example) to be eliminated.

Using a large number of repair nodes also makes routing data writes to both copies of the program impractical for performance reasons. Existing CPUs are not known to support this directly, so the hacker would have to implement the duplication in software inside an exception handler which is triggered when the memory in question is written to—this would introduce a significant performance overhead to each instance where this was required. More generally, the exception handler could be replaced by an exception or interrupt of some form, or some other process known to those skilled in the art. A large number of repair nodes distributed throughout the program renders this type of attack highly impractical, since the hacker would have to route all writes to the memory pages containing the program code through the exception handler. This assumes that our repair node distribution ensures that each memory page contains at least one repair node. Different hardware/OSes have different page sizes, which will impact the required distribution.

Unique Repair Probes

Given a large number of repair nodes, a hacker is likely to attempt to create a tool which will automatically find and analyse all of the nodes in order to determine the code replacements needed for the protected program to run, and then use these to repair his modified copy of the program such that it will also run correctly.

We can make this significantly harder by generating unique code for each repair probe, such that a pattern-based search for probes will not find all probes reliably. A pattern-based search scans the search space for one or more "signature" patterns, where these signatures have been constructed from analysis (typically manual, although automatic cannot be excluded) of known examples (examples of repair probes in this case). Sections of the search space which contain sufficient pattern matches in one or more specific configurations (typically specified as an expected ordering of matches and/or dependencies between the parts matched) are then assumed to be matches for the searched-for data.

For example, a simple repair probe might consist of code which takes the address of a location in the code section and then proceeds to write one or more immediate values to that address and subsequent addresses, followed by another series of operations using immediate values on those same locations (this last part is the read-modify/move-write pass described earlier). Although none of these instructions is particularly conspicuous by itself—the taking of a code address might be slightly uncommon in normal code on some platforms, however—they may be significantly more conspicuous when observed in close proximity to each other and in roughly the order described. The combination of a write of an immediate value to an address in the code section, for example, is unlikely to occur in normal application code, and may therefore provide a strong signal that the code is a repair probe. The same set of instructions, but in a different order, or where the dependencies between them do not definitely suggest a write to the code section, are usually more likely to be coincidental and not a strong signal of a repair probe.

The effectiveness of a pattern-based search is heavily dependent on the redundancy of the data being searched for in the search space. If all instances of the data being searched for are unique, then the pattern specification would need to contain pattern signatures for every single case, thus defeating the point of the search. i.e. if you need to have all the cases to hand in order to construct a pattern for finding them, you no longer need to find them.

For example, to generate unique code for the probes, we can build them from libraries of code fragments, where these fragments form complete repair probes when combined. By combining fragments via random selection, and by varying the order in which fragments are arranged with respect to each other, we can achieve a combinatorial expansion of repair probe variants which ensures that no two probes within a single program are the same. Indeed, by using an extremely large number of probe variants, we further can ensure that no two programs share any common repair probes, with a high degree of confidence.

Damage probes (described later) may also be uniquely generated in a manner analogous to repair probes.

Probe Placement

The simplest possible repair probe scheme would inject all repair probes into the program such that they are all executed when the program starts. This would ensure that all repair targets are repaired before any of them are encountered. However, such a scheme is relatively easy for a hacker to attack, since he could dump a copy of the program to disk immediately after the probes are executed, giving him a fully repaired copy of the code with little effort.

This would seem to suggest that probes should be placed immediately before their associated repair targets, since the hacker would then have to ensure that all repair probes are executed before dumping the program to disk, a significantly harder task. However, this too may make an attack easier for a hacker to construct, since the presence of repair probe code and unfixed repair target code right next to each other may make pattern-based searching more practical (although we do disguise unfixed repair target code to reduce this possibility).

Because of this, we do not generally place repair probes immediately before the repair targets they will be replacing (although we can do). The simplest way to do this is to place a repair probe near the start of a function and select a repair target somewhere nearer the bottom of the same function. This is fairly trivial to achieve, but we suspect that this level of separation may still be subject to attack, so our scheme attempts to place them in different functions, such that the function containing the repair probe is always entered just before the function containing the associated repair target. Probes and targets can also be in the same function.

Figure 10:
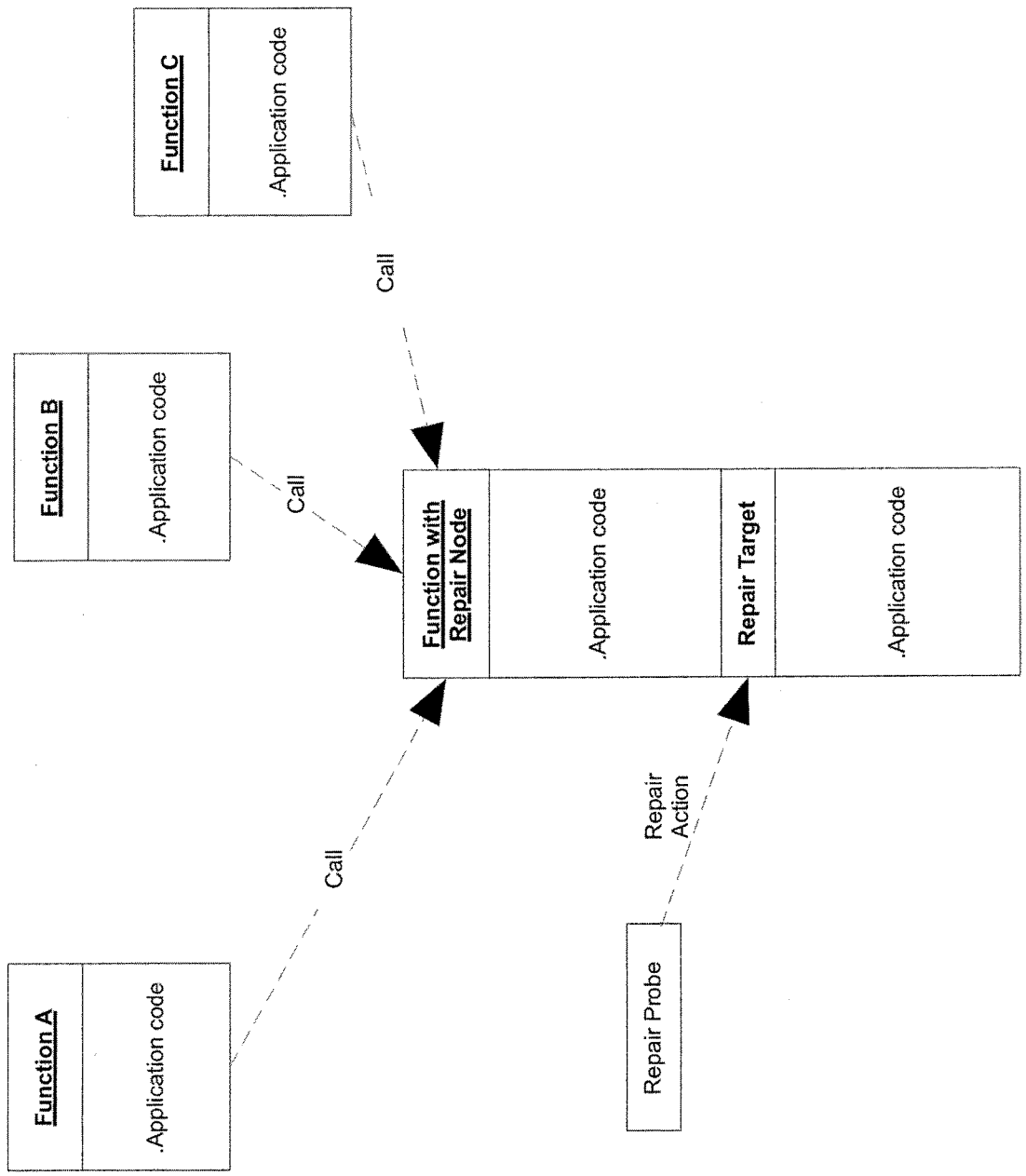
FIG. 10 shows a function containing a repair target being called from several functions.

Determining such function orderings can be very difficult. Indeed, it may be that, for any given function containing a repair target, there is no single other function that is always entered just before it—there may be several such functions, depending on how many times the function containing the repair target is called. FIG. 10 shows a function containing a repair target being called from several functions.

Figure 11:
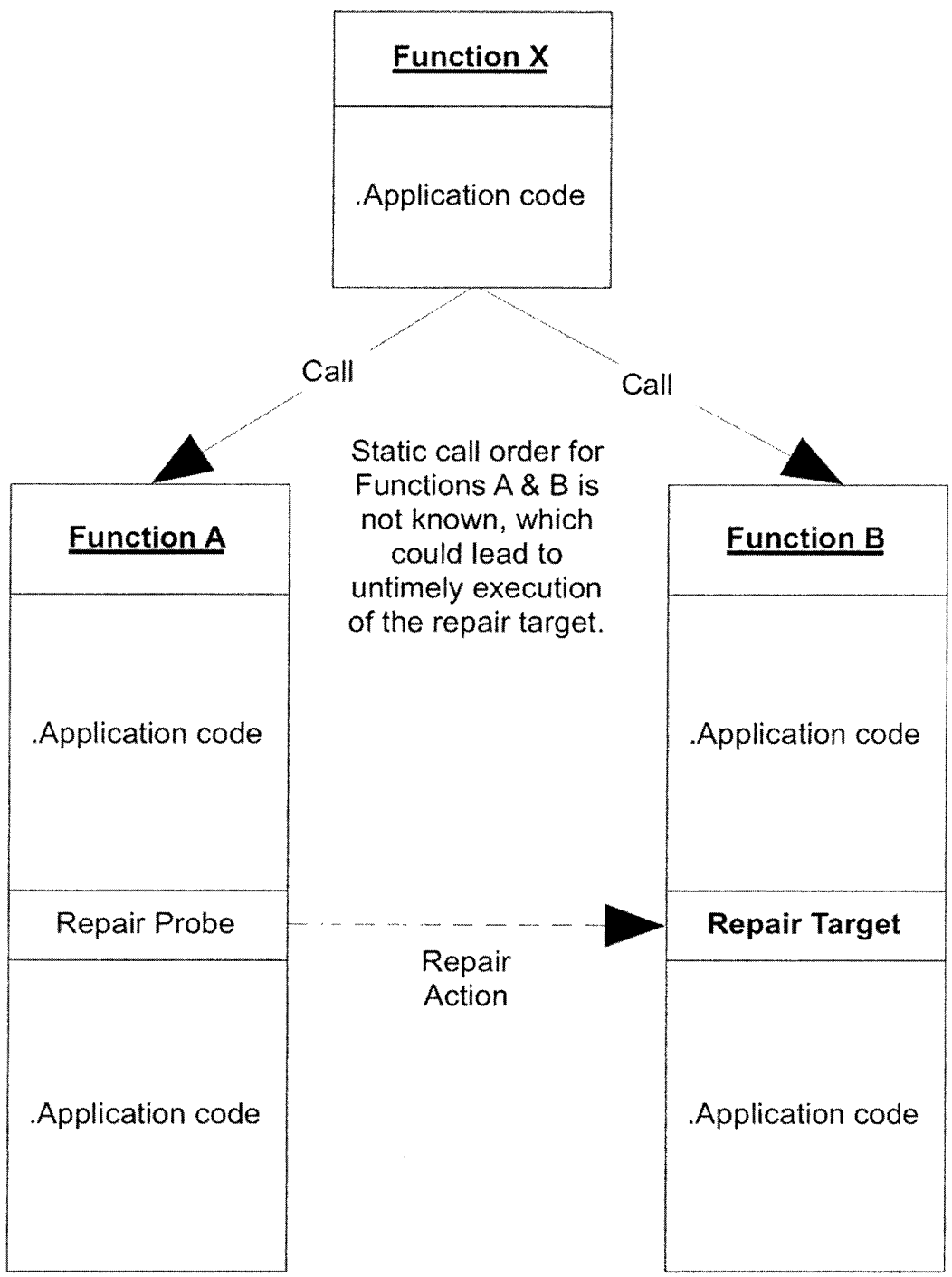
FIG. 11 shows calls to Functions A and B, where Function A may not be executed but Function B is.

Another problem with determining function orders is that there is no guarantee that any piece of code which calls a specific function will always be executed. For example, if we have a Function X which calls Function A and then later calls Function B, we cannot reliably deduce that Function A is a good place to inject a repair probe for a repair target placed in Function B, since we cannot guarantee that the call to Function A will always be executed. Even if there is no apparent logic in Function X that might cause it not to call Function A, there are ways for Function A to not be called or not to execute the repair probe code; exception mechanisms in most modern languages can cause such an effect, for example. FIG. 11 shows calls to Functions A and B, where Function A may not be executed but Function B is.

To solve these problems, we can do the following:
1. We determine function ordering only through nested function calls, i.e. we consider Function A to always be entered before Function B only if it calls Function B (or any of the functions it calls do so, to any level of nesting).
2. For any given function containing a repair target, we determine all of the functions that call this function and inject an associated repair probe in each one. This ensures that all routes to the repair target are covered by a repair probe.

Figure 12:
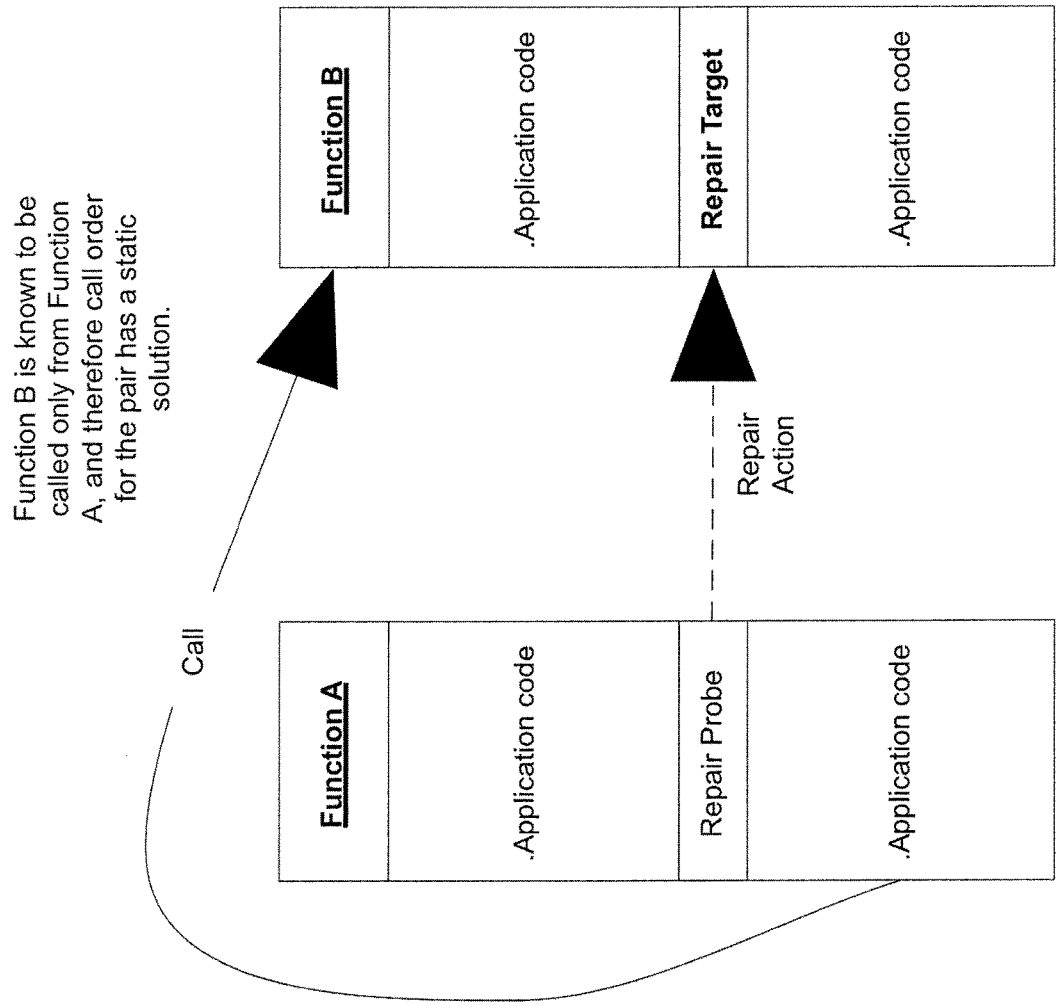
FIG. 12 shows repair nodes and derived static call order.

FIG. 12 shows repair nodes and derived static call order for the scheme described here.

Repair Nodes in Infrequently Executed Code

If a hacker cannot find all of the repair nodes in a program via a pattern-based search, then he will most likely attempt to find them via behavioural analysis. One way to do this would be to run the program in a simulation environment where all memory writes to the program code can be detected and analysed. There are a number of ways to do this, ranging from emulation (very slow) to using dedicated hardware analysers (very fast).

The main problem the hacker has with this approach is that it is difficult to know whether the simulation has found all of the repair nodes. We make this even harder by deliberately placing repair nodes in the least-frequently executed functions in the program, which significantly increases the simulation effort required to exercise (and thus reveal) all of the repair nodes, in terms of both computing time required and the effort required for the hacker to exercise every possible execution path contained in the program.

In order to determine the least-frequently executed functions in a program, we use a performance profiler, a common type of tool which measures how much time is spent in each part of a program. Most performance profilers also provide information about how many times each function is visited, and it is this information which we use to determine the least-frequently executed functions.

Damage Probes

As stated earlier, we do not simply place all repair probes at the start of the program because a hacker would attack such a scheme by allowing the repairs to occur and then dump the fixed code to disk, which he will then use as the basis for his modified version of the code.

However, a similar problem occurs if the hacker were to allow the program to run long enough (and execute with enough code coverage) to ensure that all repair probes have executed, and then dump the code. Although this is more difficult to achieve in practice and although injecting repair nodes in infrequently executed code mitigates this attack to a great extent, we still consider it a plausible attack, so we have also taken steps to make it more difficult.

To make this attack more difficult, we can also inject damage probes into the program. These are similar to repair probes, but with the opposite task: to write incorrect values into previously repaired repair targets; These can be the original, incorrect values or a new set of values. The purpose of this mechanism is to stop the program eventually transforming into a version where all repairs have been done and the code can be dumped successfully. By un-doing repairs as the program executes, it will never reach this state.

Because they are not critical to correct program operation (i.e. the program will run correctly even if all damage probes are disabled), we do not have to guarantee that a damage probe will always execute after any given repair target is executed. This is in contrast to repair probes, which must always be executed before their associated repair targets. However, like repair probes, placing a damage probe immediately after the repair target might make a pattern-based search easier for a hacker to construct, so we also avoid this. Placing a repair probe and the associated damage probe in the same function is also undesirable for the same reason.

Figure 13:
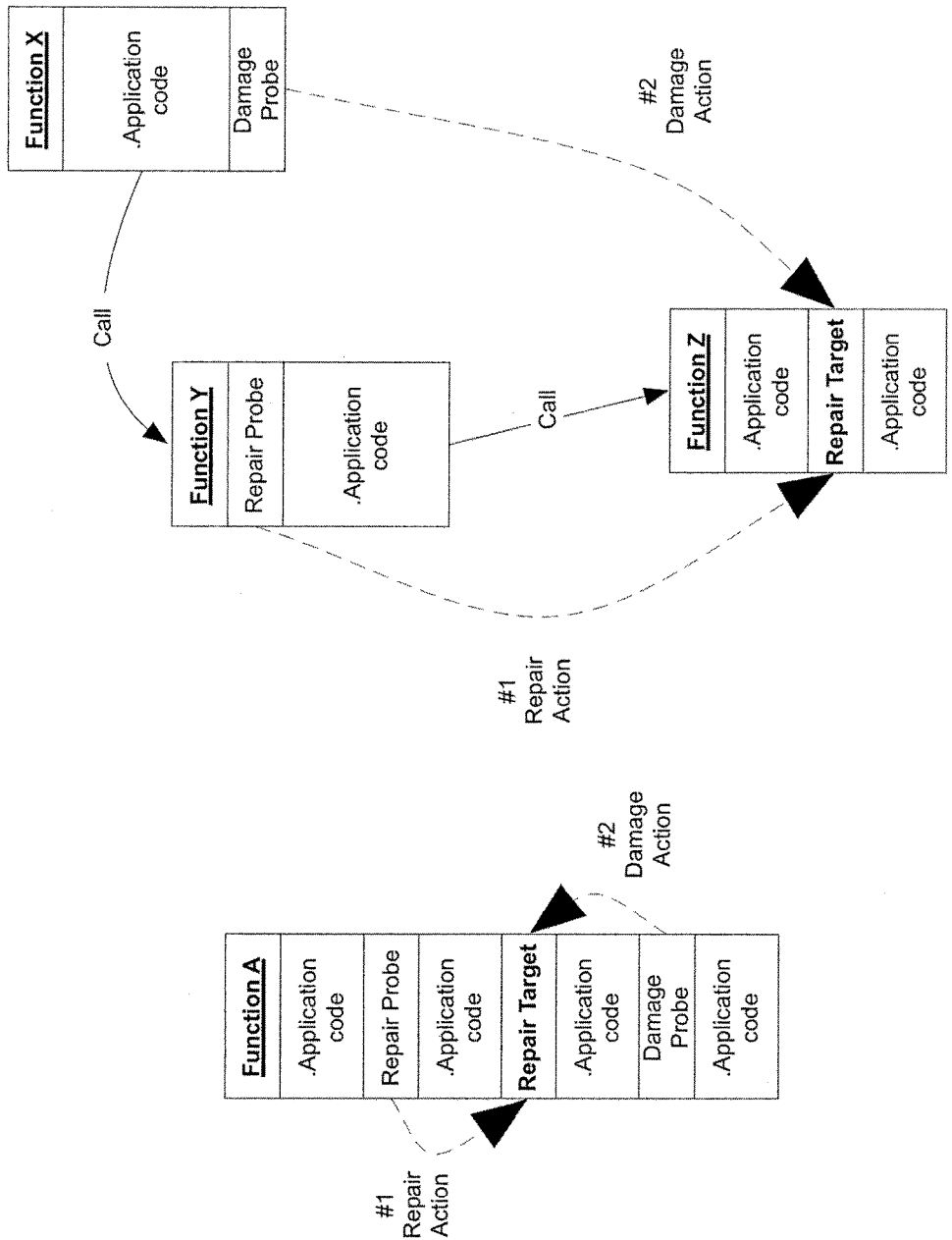
FIG. 13 shows a repair node and the position of its damage probe.

With the above in mind, we typically place a damage probe somewhere in the function call path above the function containing the associated repair probe—this is usually one level above the repair probe, but it can be placed several levels above. The damage probe is placed within the chosen function at a position after the code which (ultimately) calls the function containing the repair probe. FIG. 13 shows a repair node and the position of its damage probe.

Since it is not necessary for all repair nodes to have associated damage probes, and since probes do incur a small cost, we only inject damage probes for a subset of all repair nodes, typically those ones which are in the most infrequently executed set of functions that are selected to contain repair probes, although some random selection is also performed to eliminate patterns.

Detecting the MMU Attack

Although our defence mechanism is an indirect scheme which defeats the MMU Attack by making a protected program fundamentally incompatible with the execution model imposed by the attack, it may be useful in some circumstances to be able to detect the presence of the MMU Attack. Since direct detection is likely to be very difficult or impossible to implement and also very easy for a hacker to defeat, we have extended our indirect defence to allow it to be used to detect the MMU Attack.

Figure 14:
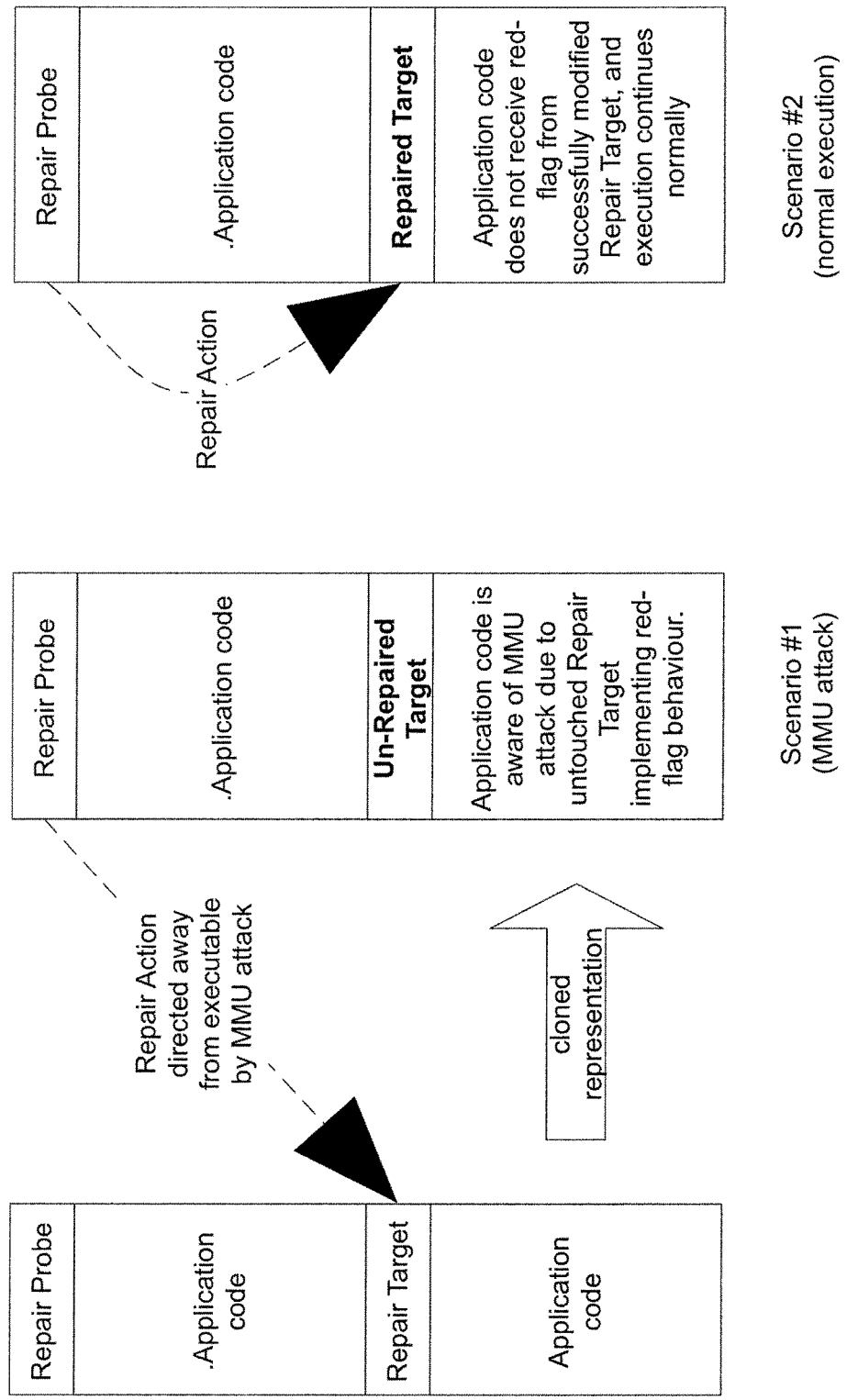
FIG. 14 shows flag-setting "incorrect" code vs. repaired code.

To do this, we observe that our defence causes incorrect code to be executed when the MMU Attack is present, and correct code to be executed under normal circumstances. Normally, the incorrect code is designed such that it will cause the program to fail when it is executed. To detect the MMU Attack, we instead construct an incorrect code fragment such that it sets an "MMU Attack" flag (which is cleared at the start of the program) and use that instead of a program-breaking incorrect code fragment. If the MMU Attack is present, then the repair target will not be replaced with the correct code, and the flag-setting incorrect code will be executed instead, setting the flag. This flag can then be read to determine if the MMU Attack is present. FIG. 14 shows flag-setting "incorrect" code vs. repaired code.

Other, similar schemes are possible. For example, rather than setting a flag, the incorrect code may contain a call to a function which will respond to the MMU Attack being present. In its most generic form, the mechanism can use any piece of code for the incorrect code which can be used to signify or respond to the MMU Attack, since it will only ever be executed when the attack is present.

Dynamic Repair Nodes

As described earlier, we make our repair node scheme hard to defeat through various means, but there is still a possibility that a hacker can obtain all of the code replacements needed by a protected program by running it through a simulator for long enough (and exercising all code paths).

To combat this, we have extended the scheme to incorporate another kind of repair node, a dynamic repair node. This is similar to a normal repair node, but rather than replacing a statically-defined section of incorrect code with correct code, it instead makes dynamic replacements to the program code which are required in order for the program to operate correctly. Since these changes are dynamic, a hacker cannot simply gather all of them in a simulator and then statically replace all of the incorrect code sections with the correct code, because there is no single correct piece of code for a dynamic repair node.

One way to do this is by converting a parameter passed to a function such that code which uses the parameter does not access it directly (as is typically done), but instead obtains its value via a piece of code which has been modified to load an identical value into a variable or register which will be used in the parameter's place. Since this mechanism requires the code to be modified to supply the correct value, it represents an analogous mechanism to a repair probe and thus also defeats the MMU Attack by causing incorrect code execution when the MMU Attack is present.

To see how this works, consider the following function (written in Intel x86 assembly language):

```
push eax
push offset string "%d\n"
call DWORD PTR [printf]
add esp, 8
ret
```

This simple function takes a single integer parameter and prints it to the screen using a "printf" function. The parameter in this case is passed to the function in the eax register. To convert this code into a form which uses code modification to achieve the same result, we replace the use of the parameter (the "push eax" line, which pushes eax onto the program stack) with code which pushes an immediate value onto the stack instead (this is our repair target), and then inject a piece of code at the start of the function (our repair probe) which modifies this immediate value (which is part of the code itself) to contain the value of eax, as shown here:

```
        lea esi, DWORD PTR[label + 1]
        mov DWORD PTR[esi], eax
label:
        push 0
        push offset string "%d\n"
        call dword ptr [printf]
        add esp, 8
        ret
```

The "push 0" line is our replacement push instruction, which we set up to initially push zero onto the stack—this will be incorrect for most calls to this function (assuming it is called with varying values).

The lines above this push instruction obtain the address of the zero value in the push instruction and write the contents of eax to this location. Now, when the push instruction is executed, it will contain the value of eax instead of zero, yielding a correct result for all calls to the function.

Figure 15:
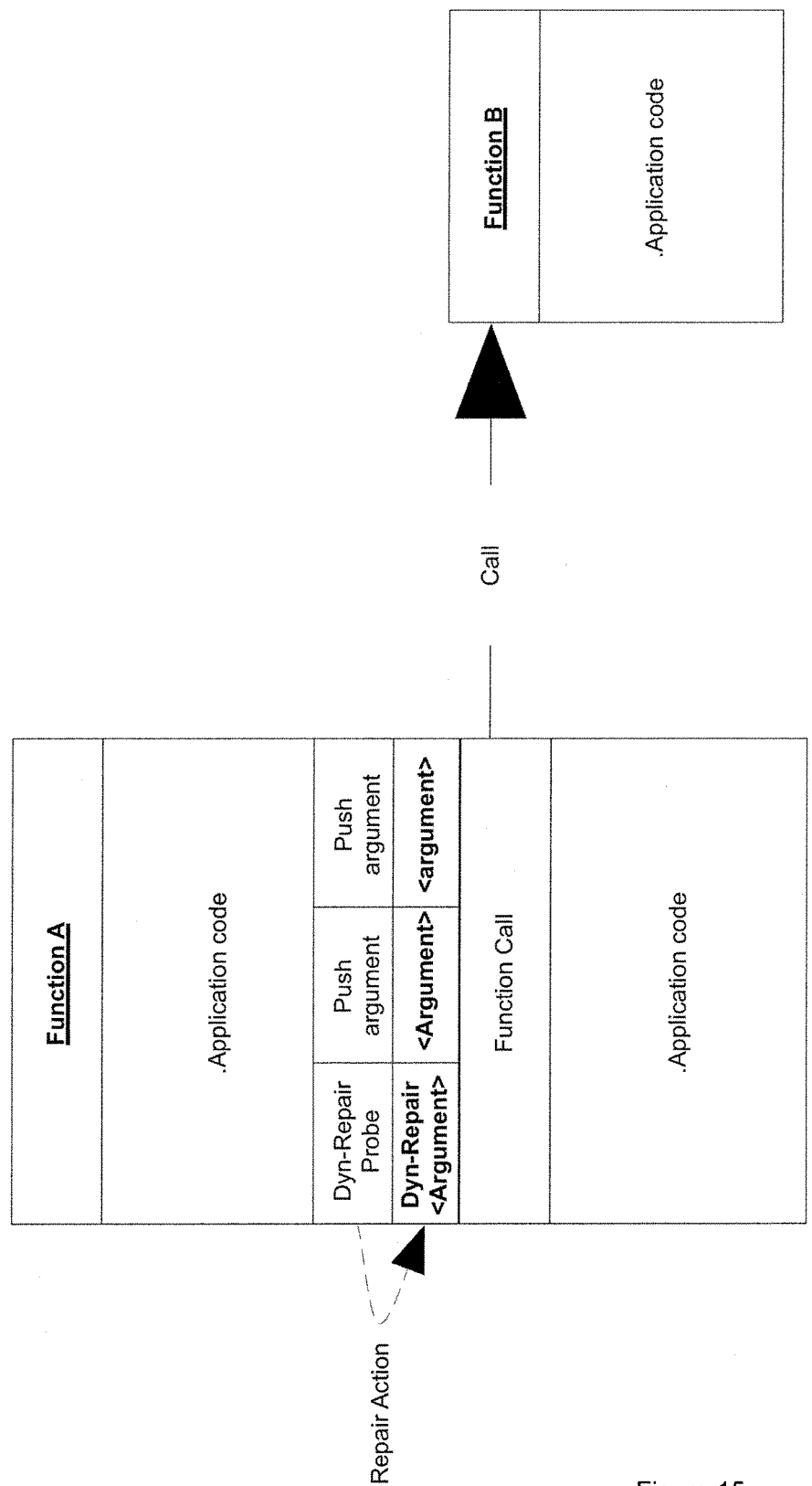
FIG. 15 shows dynamic repair nodes.

Although the example given here is written in Intel x86 assembly language, the same core mechanism can be used for code written in any language, although the precise implementation details will vary. FIG. 15 shows the dynamic repair nodes mechanism described here.

The important concept here is that we convert the direct use of a program variable (in the example above, a function parameter) into a code modification which supplies the value instead, thus requiring the code modification to be successfully carried out for the program to operate correctly. When the MMU Attack is present, the code modification will not be routed to the memory containing the version of the program actually being executed, and thus the program will fail to execute properly.

In order to stop a hacker from eliminating them, we subject dynamic repair nodes to all but two of the countermeasures used by static repair nodes:

1. We do not separate the repair probe and the repair target into separate functions, since the parameter value we write into the code is not always known until we enter the function containing the repair target. It may also be possible to separate them successfully.
2. Damage probes are not needed, since the code written to the repair target changes every time the function is called. In effect, there is no need to un-repair the code because it is almost certainly incorrect for future calls to the function anyway. This is not true for functions where the parameter we have picked happens to change infrequently or not at all. We currently assume that parameters do change in most cases, but this is not guaranteed.

Although the lack of separation between repair probes and their associated repair targets may appear to constitute a slight weakness in dynamic repair nodes compared to their static counterparts (i.e. they may be slightly easier to find via a pattern-based search), it is also the case that automatically eliminating a dynamic repair node once it has been found is significantly harder than it is for a static one, since elimination cannot be achieved simply by copying the replacement code into the hacker's modified copy of the program. Instead, the hacker must find a way to convert the code back into a form which uses the parameter directly, rather than via code modification. Although a hacker will be capable of doing this manually, creating a tool which can automate this process for thousands of repair nodes is likely to be very difficult. This can be made even harder by using unique variants.

As such, dynamic repair nodes constitute a stronger defence against the MMU Attack than static repair nodes, although it is likely that using both schemes together will constitute an even better defence. The main reason for using both schemes is that each has slightly different weaknesses, and so using a combination of them reduces the potential impact of either one's weaknesses on the system as a whole. For example, dynamic repair nodes may be easier to find than static ones—although they are harder to eliminate, being easier to find may constitute a measurable weakness, so by also having static repair nodes (which are harder to find), we compensate for the weakness by forcing the hacker to also find the (harder to find) static repair nodes. The only caveat to this approach of mixing schemes to reduce weakness exposure is that reducing the numbers of each element of each scheme may itself introduce weakness, so it is preferable that the number of elements used for each scheme is sufficiently large to mitigate this.

Proxy Repair Nodes

As described earlier, our repair node scheme means that if a hacker uses the MMU Attack, then the program will cease to function correctly. However, the hacker may be able to use the granularity of the MMU system to localise their changes to the application, and hence limit the number of repair targets they must consider.

If the hacker wishes to make only localised modifications to the application, it is only the limited number of memory pages encompassing these modifications that must be re-mapped using the MMU. Therefore, potentially, only a small number of repair nodes need be considered.

To combat this, we have extended the scheme to incorporate another kind of repair node, a proxy repair node or probe. This is similar to a normal repair node/probe but, instead of the repair target having two states (repaired and "broken"), it can exist in any one of a multitude (N) of them. Each one of these exists to proxy the actions of the program at some other location, typically well separated from the target in terms of memory layout.

In one embodiment, these other locations are those of the repair probes. Each probe would change the code at the target to proxy an action that code nearby to itself should perform. The modified code at the target is then called, it performs the proxy action, and returns to continue program execution at the probe.

Here are two pieces of code before injection of proxy repair nodes (written in Intel x86 assembly language):

Code 1:

```
xor eax, eax
push offset string "%d\n"
call dword ptr [printf]
```

Code 2:

```
xor ecx, ecx
mov edx, ABCD1234h
call dword ptr [process_value]
``` and after the injection:

Probe 1:

```
lea esi, DWORD PTR [label]
mov DWORD PTR [esi], 90C3C033h    // opcodes for xor eax, eax; ret;
                                     nop;
call label    // performs xor eax, eax; ret;
push offset string "%d\n"
call dword ptr [printf]
```

Probe 2:

```
lea esi, DWORD PTR [label]
   mov DWORD PTR [esi], 90C3C933H   // opcodes for xor ecx, ecx;
ret; nop;
   call label    // performs xor ecx, ecx; ret;
   mov edx, ABCD1234h
   call dword ptr [process_value]
```

Target:

```
label:
   nop
```

-continued

```
nop
nop
nop
```

In this way, and by the insertion of many of these into the application, there exists a complex web of interconnected dependencies between multiple targets and multiply-multiple probes. In a similar way to the dynamic repair nodes, there is no single static repair that a hacker can make to a target that satisfies all its uses. Furthermore, the hacker can no longer localise his changes to a small number of MMU pages, because the inherently nonlocal relationship between probes and targets means that the required changes themselves will be distributed all throughout the application. These techniques can easily be extended to include techniques described in, for example, section Handling MMU Read & Write Distinctions.

Appendix 1

The following discussion may be useful in interpreting the disclosures in this document.

Memory

Modern OSes provide virtual memory (including memory that can be paged to disk) and memory protection, mainly to allow many processes to co-exist without hitting hard memory limits or causing each other to crash.

To facilitate this, modern CPUs provide a way to re-map blocks of logical addresses (used by applications/processes) to physical RAM locations. These mappings are held in tables which are used directly by the MMU to convert logical addresses into physical ones. These blocks, sometimes referred to as "pages", are typically of a size much smaller than the entirety of the machine's RAM. On a typical Windows-based machine, they are four kilo-bytes in size. Mappings are usually possible with per-page granularity. Each mapping can also be associated with the type of access allowed for its associated block of logical addresses. If the incorrect type of access is attempted, an exception occurs, which is passed to the OS to handle. In some cases, an incorrect access is simply an error, and the OS may terminate the process and inform the user—for example, writing to executable or unmapped locations is typically an error in most OSes. For disk-paged memory, blocks which have been swapped out to disk are marked as inaccessible, and the exception which occurs when these are accessed is used to load those blocks back into memory and then allow the access to continue.

A logical block can (in general) be readable, writable and/or executable. Although only certain combinations of these are useful in general, CPUs typically support all combinations—the OS then normally restricts them to the useful ones (hence the kernel modification we mention to implement the MMU attack).

Appendix 2

Some of the concepts disclosed in this document may be summarized as follows.

A method of defence against an attack (the "MMU Attack") on self-checking anti-tampering systems, which defeats such self-checking mechanisms by causing them to check an unmodified copy of a protected program while executing a different, modified copy of the program, where the defence includes the following:
  a. Replacing a number of small portions of the program code with incorrect code ("repair targets") which will cause the program to fail if run in this state.
  b. Injecting new pieces of code into the program ("repair probes") which repair the incorrect code (repair targets) before they are executed, but which will not repair the copy of the program actually being executed if the MMU Attack is present.
  c. Optionally injecting new pieces of code into the program ("damage probes") which replace the code in the repair targets with incorrect code after they are executed.
  d. Combinations consisting of a repair target, one or more repair probes and zero or more damage probes to form "repair nodes".
  e. A type of repair probe which writes to the repair target, reads back some of the data written, and then writes it again, moving and/or modifying it in the process, such that the resulting data will only be consistent when data reads, data writes and instruction reads are all routed to the same locations.
  f. A type of repair probe which writes to the repair target, and then executes the code there, such that the resultant code executed is only consistent when data writes and instruction reads are all routed to the same locations.

A series of methods to stop the method of defence being detected and removed by a hacker, including the following:
  a. The use of many repair nodes, to make manual detection and removal by a human time-consuming and impractical.
  b. Ensuring that repair nodes are all unique—via code generation methods—to make automated detection and removal difficult.
  c. Separating associated repair node components (repair target, repair probe and damage probe) from each other in time and space (typically into separate functions) to make automated detection more difficult.
  d. Placing repair nodes in infrequently executed code, to thwart simulation-based detection.

A method for detecting the presence of the MMU Attack via the method of defence, without resorting to direct detection methods which are non-trivial to implement and easy for a hacker to defeat, including:
  a. A modified repair target, where the incorrect code placed in the repair target does not cause a program malfunction but instead causes a response mechanism to be executed, such as setting a flag to signify that the MMU Attack is present.

An extension to the primary method of defence which further strengthens the defence against removal by a hacker through the use of dynamic code replacement ("dynamic repair nodes"), including:
  a. Identifying the code for an assignment to a program variable, the value of which is known only at runtime;
  b. Modifying the code there ("dynamic repair target") such that the value assigned is an immediate value, unlikely to be equal to the correct runtime value;
  c. Injecting a new piece of code ("dynamic repair probe") before the dynamic repair target which modifies the immediate value in the code to contain the proper value of the original assignment, this modification not being reflected in the version of the code actually executed if an attack is present.

An extension to the primary method of defence which further strengthens the defence against removal by a hacker through the use of dynamic code replacement ("dynamic repair nodes"), including:
  a. Identifying the parameters passed to a function selected to contain a repair node, and selecting one of these parameters such that it is passed-by-value, of a trivial data type and used within the function's code.
  b. Modifying one piece of code which uses the selected function parameter ("dynamic repair target") to instead use an immediate value built into the code itself.
  c. Injecting a new piece of code ("dynamic repair probe") before the dynamic repair target which modifies the immediate value in the code to contain the value of the selected function parameter before it is executed. This modification will not be reflected in the version of the code actually being executed if the MMU Attack is present.
  d. Applying the methods used to stop detection and removal of normal repair nodes to dynamic repair nodes, but not including:
    i. Separating the dynamic repair node's components into separate functions.
    ii. The use of "dynamic damage probes", which are not required.
  e. Applying the method used with normal repair nodes to allow continued defence on computer systems containing MMUs which can distinguish between data reads and writes to dynamic repair nodes.
A solution to the "MMU Attack" on self-checking anti-tampering systems is provided. This attack, also known as the "TLB Attack", aims to neutralise self-checking systems by fooling them into checking an unmodified copy of a program, rather than the one being executed. There is provided an indirect defeat of this attack by causing the program to only operate correctly when code and data memory accesses are synchronised.

The invention claimed is:
1. A computer implemented method of protecting a computer program executable on a computer comprising a memory management unit configured to route data and code accesses/fetches to a same logical address either to different or to identical physical addresses in computer memory when executing a program, the method comprising:
  modifying a repair target code section of program code stored in computer memory so the program code of the repair target code section will not execute correctly; and
  inserting, into the program code in the computer memory, a plurality of repair probe code sections,
  wherein each of the repair probe code sections is configured to, at runtime,
    replace the repair target code section with a respective distinct correct code portion, only when the memory management unit routes the data and code accesses/fetches to the same logical address to identical physical addresses in computer memory, and
    call the respective distinct correct code portion at the repair target code section, each of the respective distinct correct code portions performing, at runtime, a respective distinct action, and a return to continue program execution at the repair probe code section calling the respective distinct correct code portion.
2. The method of claim 1, wherein modifying the repair target code section and replacing the repair target code section with a correct code portion prevents an attack wherein code and data memory accesses/fetches to a same logical address are routed to different physical addresses.
3. The method of claim 1, wherein the repair probe code sections fix the repair target code section, at runtime, before the repair target code section is executed.
4. The method of claim 3, wherein at least one of the repair probe code sections:
  performs first writes of data to the repair target code section as code;
  reads back at least some of the data that was written; and
  performs second writes of the data that was read to the repair target code section as data.
5. The method of claim 3, further comprising inserting, into the program code, a proxy repair probe that writes code and/or data to the repair target code section such that the repair target code section proxies the actions of the program code at some other location, and such that the resultant code made to execute at the repair target code section in place of that at the other location is only consistent when data writes and instruction reads are all routed to the same locations.
6. The method of claim 1, further comprising inserting, into the program code, a plurality of repair nodes, to make manual detection and removal of the repair nodes by a human time consuming, each repair node comprising a repair target code section, at least one repair probe code section and a damage probe code section, the repair target code section being configured to be not correctly executable, the repair probe code section being configured to fix at runtime the repair target code section of the repair node, before the repair target code section of the repair node is executed, and the damage probe code section being configured to write data that will not execute correctly into the repair target code section of the repair probe, at runtime, after the repair target code section of the repair probe is executed.
7. The method of claim 6, further comprising generating the repair nodes to be unique.
8. The method of claim 6, further comprising separating the repair target code section, the repair probe code section, and the damage probe code section of a repair node from each other in at least one of execution time, separation in units of code, and/or by called functions.
9. The method of claim 6, further comprising placing repair nodes in infrequently executed code.
10. The method of claim 1, wherein code and data fetches to the same logical address are routed to different physical addresses when an attack occurs.
11. The method of claim 1, further comprising inserting, into the program code, another repair target code section that, when executed, causes a response mechanism to provide an indication that an attack has occurred.
12. The method of claim 1, further comprising:
  identifying, in the program code, a location of a dynamic repair target code for an assignment to a program variable, the value of which is known only at runtime;
  modifying the program code at the identified dynamic repair target code location to be different from a correct runtime value;
  injecting dynamic repair probe code that is executed before the dynamic repair target code and, at runtime, modifies the immediate value in the code to contain the correct runtime value when an attack has not occurred.
13. The method of claim 12, further comprising separating the dynamic repair target code and the dynamic repair probe code components into separate functions.
14. The method of claim 12, further comprising injecting new code sections of dynamic damage probe code sections into the program code and writing incorrect values with these dynamic damage probe code sections into previously repaired dynamic repair targets after the dynamic repair targets are executed.

15. The method of claim 1, further comprising:
identifying parameters passed to a function selected to contain a repair node;
selecting one of the parameters that it is a passed-by-value, of a trivial data type, and used within the code of the function;
modifying one piece of the code of the function that uses the selected function parameter as a dynamic repair target to use an immediate value built into the code;
injecting dynamic repair probe code before the dynamic repair target that modifies the immediate value in the code of the function to contain the value of the selected function parameter before it is executed, when an attack has not occurred.

16. A computer implemented system for protecting computer program code, the computer implemented system comprising a computer configured to:
modify a repair target code section of a program code stored in computer memory so that program code stored in the repair target code section will not execute correctly; and
insert, into the program code, in the computer memory a plurality of repair probe code sections, each of the repair probe code sections configured to
replace program code in the repair targets code section, at runtime, with a respective distinct correct code portion, before the repair target code section is executed, only if data and code accesses/fetches to the same logical address are routed to identical physical addresses in computer memory, and
call the respective correct code portion at the repair target code section, each of the respective correct code portions performing, at runtime, a respective distinct action and returning to continue program execution at the repair probe code section that replaced program code in the repair target code section, wherein the computer stores the modified computer code on a non-transitory storage medium.

17. A non-transitory computer readable medium storing program code that, when executed, causes a machine to at least create:
a repair target section comprising program code that will not execute correctly; and
a plurality of repair probe sections each replacing the repair target section, at runtime, with a respective correct code portion, before the repair target section is executed, only when code and data memory accesses/fetches are synchronized, such that data and code accesses/fetches to a same logical address are routed to identical physical addresses in computer memory,
wherein each repair probe section is configured to, at runtime, replace the repair target section with its respective correct code portion and call the respective correct code portion at the repair target section, each of the respective correct code portions performing, at runtime, a respective distinct action and returning to continue program execution at the calling repair probe section.

18. A non-transitory computer readable medium storing a computer program that comprises:
a repair target code section that will not execute correctly; and
a plurality of repair probe code sections that, when executed, at runtime, of the computer program, cause a processor to, when data and code accesses/fetches to a same logical address are routed to identical physical addresses in computer memory,
replace code stored in the repair target code section with a respective correct code portion before the repair target code section is executed, and
call the respective correct code portion at the repair target code section, each of the correct code portions performing, at runtime, a respective distinct action and returning to continue program execution at the repair probe section that called the repair target code section.

19. A computer comprising
a processor; and
a non-transitory computer readable medium storing a computer program having:
a repair target code section that will not execute correctly, and
a plurality of repair probe code sections each associated with a respective correct code portion for performing, at runtime, a respective distinct action,
wherein data and code accesses/fetches to a same logical address may be routed to different physical addresses in computer memory when executing the computer program, and
wherein each of the plurality of repair probe code sections is configured to, when executed and when data and code accesses/fetches to a same logical address are routed to identical physical addresses in computer memory, cause the processor to at least:
replace code in the repair target code section with its respective correct code portion before the repair target section is executed,
call the respective correct code portion at the repair target section, and
return to continue program execution at the calling repair probe section.

* * * * *